US011683778B2

(12) United States Patent
Fernandez et al.

(10) Patent No.: US 11,683,778 B2
(45) Date of Patent: Jun. 20, 2023

(54) ACTIVE GEO-LOCATION FOR ORTHOGONAL FREQUENCY DIVISION MULTIPLEX WIRELESS LOCAL AREA NETWORK DEVICES USING ADDITIVE CORRELATION

(71) Applicant: SR Technologies, Inc., Sunrise, FL (US)

(72) Inventors: Olivia Fernandez, Boca Raton, FL (US); Ryan Busser, Fort Lauderdale, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 180 days.

(21) Appl. No.: 17/319,902

(22) Filed: May 13, 2021

(65) Prior Publication Data

US 2022/0078743 A1 Mar. 10, 2022

Related U.S. Application Data

(60) Provisional application No. 63/074,852, filed on Sep. 4, 2020.

(51) Int. Cl.
*H04W 64/00* (2009.01)
*H04L 43/0864* (2022.01)

(52) U.S. Cl.
CPC ......... *H04W 64/00* (2013.01); *H04L 43/0864* (2013.01)

(58) Field of Classification Search
CPC . H04W 64/00; H04L 43/0864; H04L 41/0631
See application file for complete search history.

(56) References Cited

U.S. PATENT DOCUMENTS

| 2004/0203912 A1* | 10/2004 | Budka | H04W 64/00 455/456.1 |
| 2019/0285722 A1* | 9/2019 | Markhovsky | G01S 1/042 |
| 2020/0217947 A1* | 7/2020 | Stitt | G07C 9/00309 |

* cited by examiner

*Primary Examiner* — Steven H Nguyen
(74) *Attorney, Agent, or Firm* — Christopher & Weisberg, P.A.

(57) ABSTRACT

A method in a wireless device (WD) is described. The method is at least for determining a geo-location of a target station using round-trip times (RTTs) of a plurality of signals transmitted by the WD and a plurality of response signals received from the target station corresponding to the plurality of signals transmitted by the WD. The method includes determining an expected response signal, and, for each transmitted signal of the plurality of signals, determining that a response signal type matches an expected response signal type, cross-correlating a set of samples of the response signal, searching for a predetermined characteristic of the expected response signal, and correlating at least a subset of bits of the set of bits of the received response signal with the set of expected bits of the expected response signal. Further, a peak rolling sum correlation and the RTTs are determined.

20 Claims, 19 Drawing Sheets

ACTIVE GEO-LOCATION FOR ORTHOGONAL FREQUENCY DIVISION MULTIPLEX WIRELESS LOCAL AREA NETWORK DEVICES USING ADDITIVE CORRELATION

CROSS-REFERENCE TO RELATED APPLICATION

This application is related to and claims priority to U.S. Provisional Patent Application Ser. No. 63/074,852, filed Sep. 4, 2020, entitled IMPROVEMENTS FOR ACTIVE GEO-LOCATION FOR ORTHOGONAL FREQUENCY DIVISION MULTIPLEX WIRELESS LOCAL AREA NETWORK DEVICES USING ADDITIVE CORRELATION, the entirety of which is incorporated herein by reference.

TECHNICAL FIELD

The present disclosure relates to geo-location of wireless devices, and in particular to a method, device and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response packet from the target device and compare that to the time of departure (TOD) of the request packet that was transmitted by the measuring device so as to determine the round trip time (RTT).

In such location systems it is common to use multiple measuring devices to determine the location. In such a scheme, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three airborne measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can be used to calculate the distance D1 130 using the formula D1=(RTT1*c)/2 where c is the speed of light. Similarly, RTT2 and RTT3 measurements result in the determination of distances D2 140 and D3 150. The methods for calculating the location of target station 120 using the distances D1 130, D2 140 and D3 150 are well known.

FIG. 2 is a diagram of an airborne measuring station 110 actively geo-locating target stations 120a, 120b, 120c and 120d. The target station 120a depicts the example of an outdoor device, target station 120b depicts the example of a device inside a residential home, target station 120c depicts the example of a device inside an automobile, and target station 120d depicts the example of an apartment. The radio frequency (RF) obstruction losses for each of the target stations 120a, 120b, 120c and 120d will differ and hence the maximum range at which the airborne measuring station 110 can successfully geo-locate the target stations will vary. From the airborne measuring station's 110 perspective, the range will be dependent upon two factors: the transmit power of the ranging packet, which should be such that the target station will successfully receive it, and the receive sensitivity of the airborne measuring station 110 which would be such that the response packet is received successfully. Transmitting the ranging packet at a sufficiently high power is straightforward, e.g., by using a higher power amplifier and/or higher gain antenna, but the receive sensitivity of the airborne measuring station 110 is generally restricted to the noise figure of the receiver.

The signal level, Pr, received at the airborne measuring station 110 is:

$$Pr = Pt + G_1 + G_2 - L_{fs} - Lo \quad (1)$$

Where Pt=Transmit power from the target station 120
$G_1$=Antenna gain at the airborne measuring station
$G_2$=Antenna gain at the target station
$L_{fs}$=Propagation loss, free space
Lo=Obstruction loss The obstruction loss, Lo, for the path from the target station 120a and the airborne measuring station 110 can be assumed to be zero as the target station 120a has a line-of-sight path to the airborne measuring station 110. In contrast, the obstruction losses for the other target stations may, for example, be in the order of 10 dB for target station 120b, 6 dB for target station 120c and 15-20 dB for target station 120d. The range of the airborne measuring station 110 to successfully detect the response packets from each of these target stations is limited due to the fixed sensitivity of the airborne measuring station 110 which is restricted by the noise figure of the receiver and the need to receive a packet without errors.

SUMMARY

Methods, wireless devices, and systems for determining geo-location of orthogonal frequency division multiplex WLAN devices using additive correlation are described.

According to one aspect of the present disclosure, a method in a wireless device (WD) is described. The method is at least for determining a geo-location of a target station using round-trip times (RTTs) of a plurality of signals transmitted by the WD to the target station and a plurality of response signals received from the target station corresponding to the plurality of signals transmitted by the WD. The method comprises determining an expected response signal. The expected response signal has an expected response signal type and includes a set of expected samples and a set of expected bits.

The plurality of signals is transmitted. The method includes, for each transmitted signal of the plurality of signals, receiving a response signal corresponding to the transmitted signal. The response signal has a response signal type and includes a set of samples and a set of bits. The method includes, for each transmitted signal of the plurality of signals, determining that the response signal type matches the expected response signal type based on at least a subset of the set of samples; cross-correlating the set of samples of the response signal with the set of expected samples of the response signal and searching for a predetermined characteristic of the expected response signal; and correlating at least a subset of bits of the set of bits of the received response signal with the set of expected bits of the expected response signal. The correlation of at least the subset of bits generates a plurality of correlation outputs.

The method further includes determining a peak rolling sum correlation based at least in part on the plurality of correlation outputs and determining the RTT for each transmitted signal of the transmitted plurality of signals based at least in part on the corresponding peak rolling sum correlation. The determined RTT is usable to determine the geo-location of the target station.

In some embodiments, the method further includes, for each transmitted signal of the plurality of signals, opening a reception window for receiving the response signal, where the response signal is received within the reception window, and performing the determination that the response signal type matches the expected response signal type while the reception window for receiving the response signal is open.

In some other embodiments, cross-correlating the set of samples of the received response signal is performed in a set of branches, where each branch of the set of branches tunes to a different time offset to cover a range of carrier frequency offsets. The method further includes determining a set of rolling sums for each branch of the set of branches based at least on an amount of samples in a rolling sum window, a number of samples in the reception window, and a number of packets in a burst. Further, determining the peak rolling sum correlation is further based in part on the determined set of rolling sums for each branch of the set of branches.

In one embodiment, a maximum correlation value is determined from the plurality of correlation outputs for each reception window, and the maximum correlation value is summed for each sample in each reception window.

In another embodiment, a first time and a second time are determined, where the first time is a time of transmission of each transmitted signal, the second time is a time of reception of the peak rolling sum. The RTT for each transmitted signal of the transmitted plurality of signals is determined based at least on the first time and the second time. Further, the geo-location of the target station is determined based on the RTT for each transmitted signal.

In some embodiments, the transmitted plurality of signals are orthogonal frequency diversity modulation (OFDM) signals transmitted in a burst of N transmissions. The transmitted plurality of signals has a time between each transmission and a wait time between the burst and a subsequent burst. The response signal type is an OFDM waveform.

In some other embodiments, each transmitted signal is one of a request-to-send (RTS) signal and a data null signal. The set of expected samples of the expected response signal includes a preamble waveform. In addition, the predetermined characteristic of the expected response signal is a predetermined periodicity of the preamble waveform.

In one embodiment, the set of bits of the response signal includes coded bits. In addition, the method further includes determining a plurality of seeds associated with the response signal, demodulating the coded bits of the response signal, and performing the correlation of at least the subset of bits of the set of bits of the received response signal for each seed of the plurality of seeds based in part on the demodulated coded bits.

In another embodiment, an end of transmission of the plurality of signals is detected. At least a corresponding confidence factor is attached to the peak rolling sum correlation if the peak rolling sum correlation exceeds at least a predetermined threshold. In addition, the geo-location of the target station is determined based at least on the attached at least corresponding confidence factor.

In some embodiments, the determined set of rolling sums is a rolling sum value RS that is defined as:
for $$i = \frac{(s-1)}{2} \text{ to } W - \frac{(s-1)}{2}$$

$$RS_i = \sum_{i-\frac{(s-1)}{2}}^{i+\frac{(s-1)}{2}} ac_i$$

where s=samples in the rolling sum window,
W=number of samples in the reception window;

for $i=1$ to $W$, $ac_i = \Sigma_{n=1}^{N} C_{ni}$ where N is the number of packets in a burst; and $C_{ni} = \text{MAX}\{c_{ni}\}$ where $C_{ni}$ is the correlation value for ith sample in reception window n.

According to another aspect, a wireless device (WD) is described. The WD is at least for determining a geo-location of a target station using round-trip times (RTTs) of a plurality of signals transmitted by the WD to the target station, and response signals received from the target station corresponding to the transmitted signals. The WD includes a transmitter configured to transmit the plurality of signals and a receiver configured to receive a response signal for each transmitted signal of the plurality of signals. The received response signal corresponds to the transmitted signal, where the response signal has a response signal type and includes a set of samples and a set of bits.

The WD also includes processing circuitry in communication with the transmitter and the receiver. The processing circuitry is configured to determine an expected response signal. The expected response signal has an expected response signal type and includes a set of expected samples and a set of expected bits. The processing circuitry is further configured to, for each transmitted signal of the plurality of signals, determine that the response signal type matches the expected response signal type based on at least a subset of the set of samples, cross-correlate the set of samples of the response signal with the set of expected samples of the response signal, and search for a predetermined characteristic of the expected response signal. In addition, the processing circuitry is configured to, for each transmitted signal of the plurality of signals, correlate at least a subset of bits of the set of bits of the received response signal with the set of expected bits of the expected response signal. The correlation of at least the subset of bits generates a plurality of correlation outputs. The processing circuit is further configured to determine a peak rolling sum correlation based at least in part on the plurality of correlation outputs and determine the RTT for each transmitted signal of the transmitted plurality of signals based at least in part on the corresponding peak rolling sum correlation. The determined RTT is usable to determine the geo-location of the target station.

In some embodiments, the processing circuitry is further configured to, for each transmitted signal of the plurality of signals, cause the receiver to open a reception window for receiving the response signal, which is received within the reception window, and perform the determination that the response signal type matches the expected response signal type while the reception window for receiving the response signal is open.

In some other embodiments, the processing circuitry is further configured to determine a maximum correlation value from the plurality of correlation outputs for each reception window and sum the maximum correlation value for each sample in each reception window.

In one embodiment, the processing circuitry is further configured to determine a first time and a second time, where the first time is a time of transmission of each transmitted signal, and the second time is a time of reception of the peak rolling sum. Determining the RTT for each transmitted signal of the transmitted plurality of signals is further based at least on the first time and the second time. Further, the processing circuitry is configured to determine the geo-location of the target station based on the RTT for each transmitted signal.

In another embodiment, the transmitted plurality of signals are orthogonal frequency diversity modulation (OFDM) signals transmitted in a burst of N transmissions. The transmitted plurality of signals has a time between each transmission and a wait time between the burst and a subsequent burst. The response signal type is an OFDM waveform.

In some embodiments, each transmitted signal is one of a request-to-send (RTS) signal and a data null signal. The set of expected samples of the expected response signal includes a preamble waveform. The predetermined characteristic of the expected response signal is a predetermined periodicity of the preamble waveform.

In some other embodiments, the set of bits of the response signal includes coded bits. In addition, the processing circuitry is further configured to determine a plurality of seeds associated with the response signal, demodulate the coded bits of the response signal, and perform the correlation of at least the subset of bits of the set of bits of the received response signal for each seed of the plurality of seeds based in part on the demodulated coded bits.

In one embodiment, cross-correlating the set of samples of the received response signal is performed in a set of branches, where each branch of the set of branches tunes to a different time offset to cover a range of carrier frequency offsets. Further, the processing circuitry is configured to determine a set of rolling sums for each branch of the set of branches based at least on an amount of samples in a rolling sum window, a number of samples in the reception window, and a number of packets in a burst. The processing circuitry also is configured to determine the peak rolling sum correlation further based in part on the determined set of rolling sums for each branch of the set of branches.

In another embodiment, the processing circuitry is further configured to detect an end of transmission of the plurality of signals, attach at least a corresponding confidence factor to the peak rolling sum correlation if the peak rolling sum correlation exceeds at least a predetermined threshold, and determine the geo-location of the target station based at least on the attached at least corresponding confidence factor.

According to another aspect, a measuring station is described. The measuring station includes a wireless device (WD) for determining a geo-location of a target station using round-trip times (RTTs) of a plurality of signals transmitted by the WD to the target station, and response signals received from the target station corresponding to the transmitted signals. The WD includes a transmitter configured to transmit the plurality of signals. The WD also includes a receiver configured to, for each transmitted signal of the plurality of signals, open a reception window for receiving a response signal corresponding to one transmitted signal and receive the response signal within the reception window. The received response signal has a response signal type and includes a set of samples and a set of bits, which include coded bits.

The WD further includes processing circuitry in communication with the transmitter and the receiver. The processing circuitry is configured to determine an expected response signal, which has an expected response signal type and includes a set of expected samples and a set of expected bits. In addition, the processing circuitry is configured to, for each transmitted signal of the plurality of signals, determine a first time that is a time of transmission of each transmitted signal, and, while the reception window is open, determine that the response signal type matches the expected response signal type based on a subset of the set of samples. The processing circuitry is configured to, for each transmitted signal of the plurality of signals, cross-correlate the set of samples of the response signal with the set of expected samples of the response signal, search for a predetermined characteristic of the expected response signal, and correlate at least a subset of bits of the set of bits of the received response signal with the set of expected bits of the expected response signal. The correlation of at least the subset of bits generates a plurality of correlation outputs.

The processing circuitry is configured to determine a maximum correlation value from the plurality of correlation outputs for each reception window and sum the maximum correlation values for each sample in each reception window. Further, the processing circuitry is configured to determine a peak rolling sum correlation and a second time that is a time of reception of the peak rolling sum and determine the RTT for each transmitted signal of the transmitted plurality of signals based at least on the first time and the second time in part to determine the geo-location of the target station.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

This Application incorporates U.S. patent application Ser. No. 16/708,923 and U.S. patent application Ser. No. 16/782,762 by reference in their entireties. As an initial matter, it is noted that improving the effective sensitivity of the measuring receiver as compared with known arrangements will increase the range at which target stations 120 may be detected and located as compared to known methods. In one embodiment of the present disclosure, a single airborne measuring station 110 is used. The present disclosure provides methods and devices that increase the range of active geo-location from the airborne measuring station 110 as compared to known methods. In some embodiments, the disclosed method applies to the reception of orthogonal frequency division multiplex (OFDM) acknowledgement (ACK) and clear-to-send (CTS) packets in response to data null and request-to-send (RTS) packets respectively, in the Wi-Fi bands.

Figure 1:
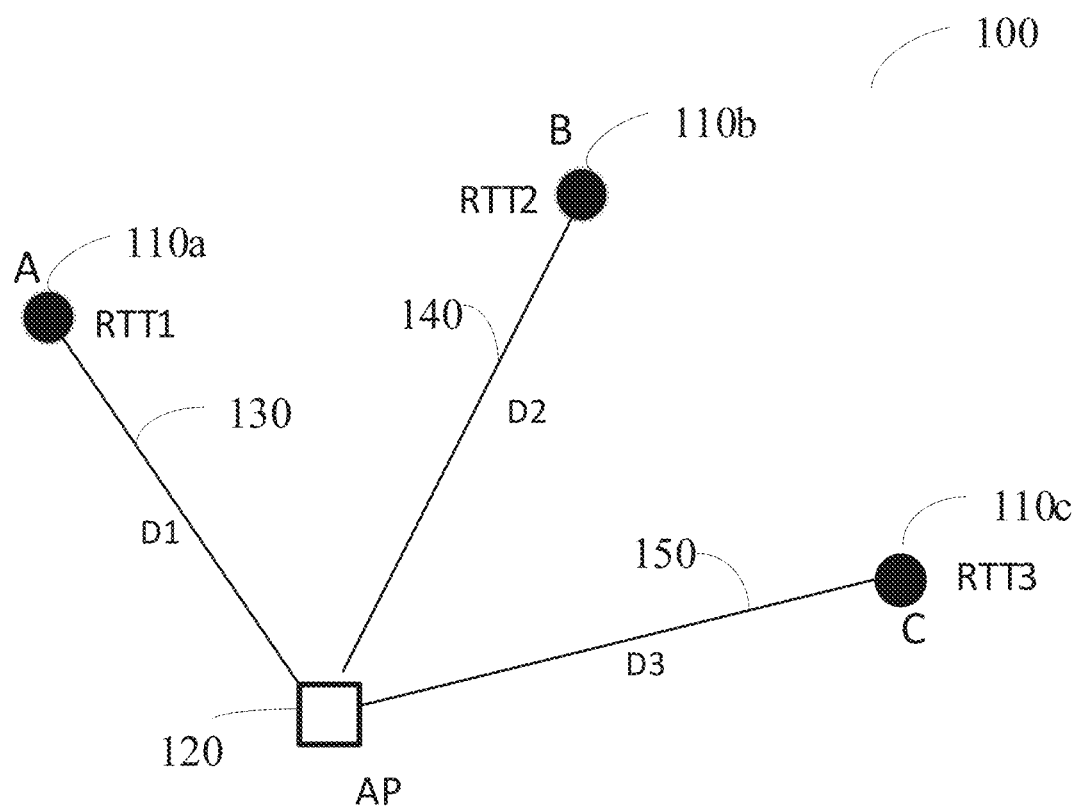
FIG. 1 is a diagram of a typical location system which includes three measuring stations.
Figure 2:
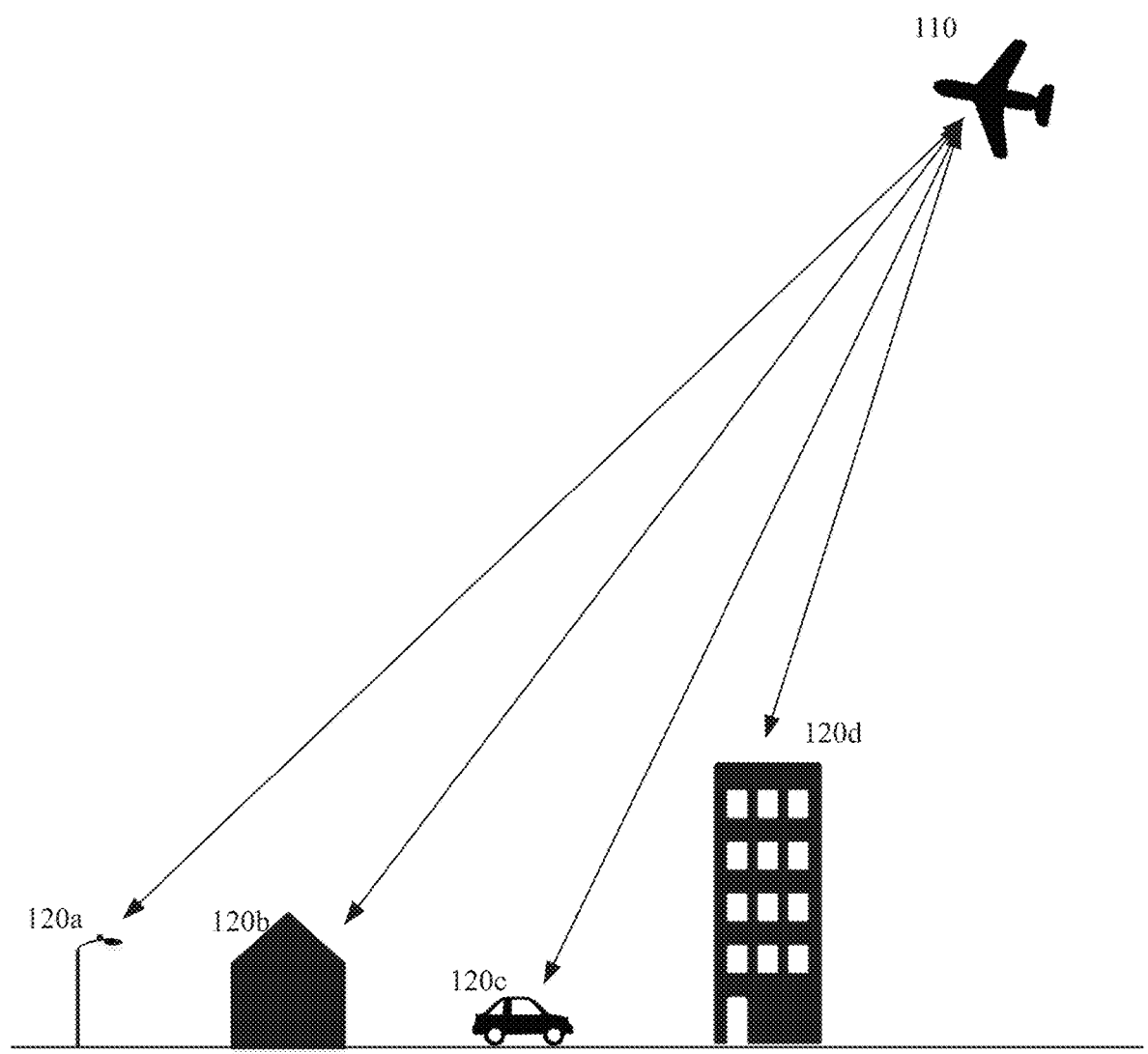
FIG. 2 is a diagram of an airborne measuring station actively geo-locating target stations.
Figure 3:
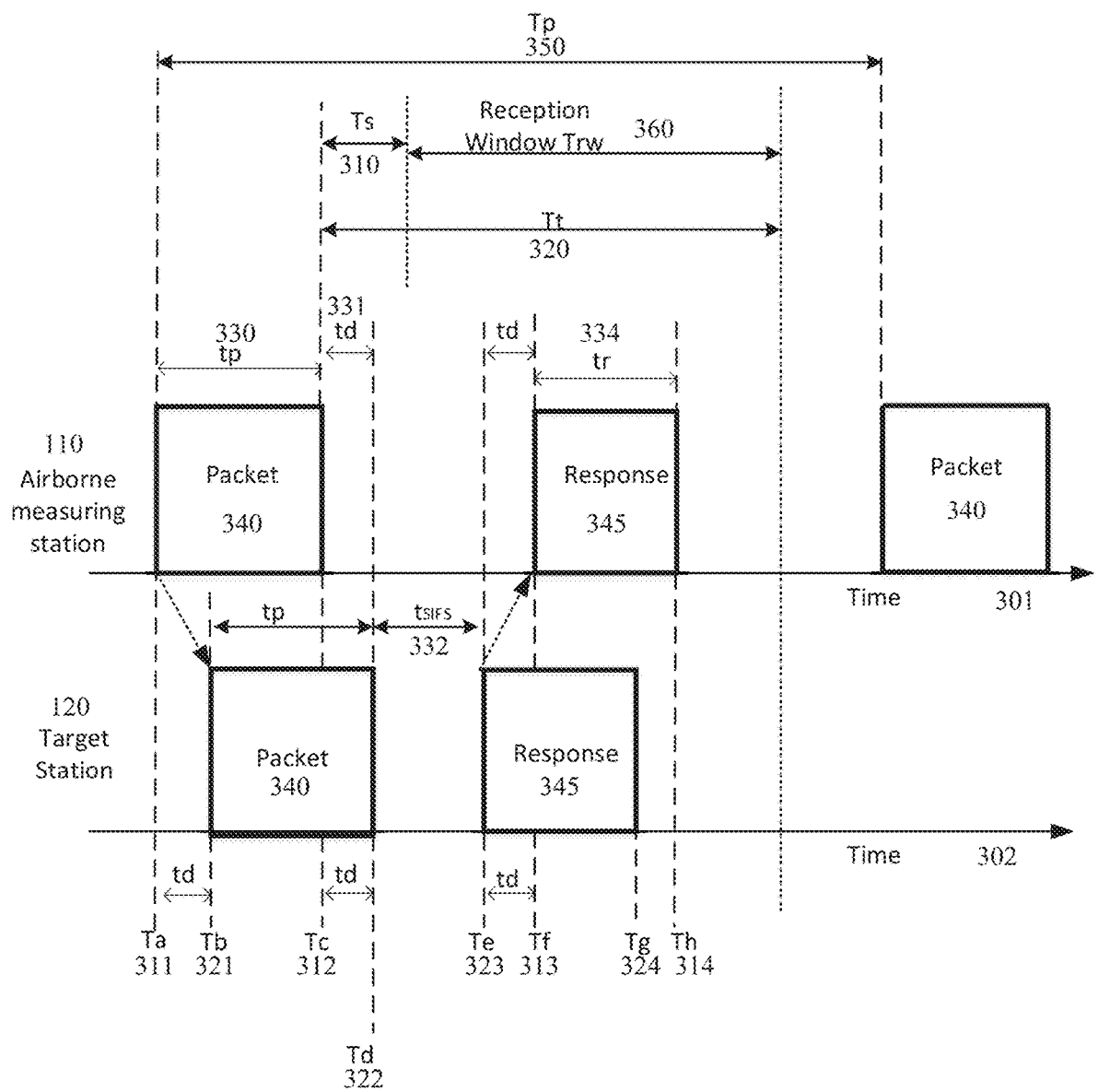
FIG. 3 is a timing diagram that describes a ranging method of the present disclosure that may be used to determine the distance between two wireless devices.

FIG. 3 is a timing diagram that describes a ranging transmission method of the present disclosure that may be used to determine the distance between two wireless devices. Time axis 301 is the time axis for airborne measuring station 110 and time axis 302 is the time axis for target station 120. At time Ta 311, airborne measuring station 110 starts the transmission of ranging packet 340 which is addressed to target station 120. After a time-delay of td, at time Tb 321, target station 120 starts to receive ranging packet 340. At time Tc 312, airborne measuring station 110 completes the transmission of ranging packet 340 and at time Td 322, target station 120 completes the reception of ranging packet 340. The time difference between Tc 312 and Td 322 is td 331, the propagation time for the packet to travel from airborne measuring station 110 to target station 120. Note that the time differences (Tc−Ta) and (Td−Tb) are both the duration tp 330 of the transmitted ranging packet 340.

Target station 120 transmits the response packet 345 at time Te 323. Assuming that the response packet 345 is an ACK or an RTS packet in reply to the received ranging packet 340, time Te 323 ideally will be at a time $t_{SIFS}$ 332 after time Td 322, where $t_{SIFS}$ 332 is the SIFS time as defined in the IEEE 802.11 standard. At time Tf 313, airborne measuring station 110 starts to receive the response packet 345. At time Tg 324, target station 120 completes the transmission of the response packet 345 and at time Th 314, airborne measuring station 110 completes receiving the response packet 345. Note that the time differences (Tb−Ta), (Td−Tc), (Tf−Te) and (Th−Tg) are all equal and have the value td which is the propagation time for the packet and response to travel between the two stations.

At airborne measuring station 110, the time of a packet at the point when the frame check has completed, may be recorded. Hence, at airborne measuring station 110, the time for the transmission of ranging packet 340 that is recorded, is Tc 312, and the time that is recorded for the reception of the response packet 345 is Th 314. In order to calculate the value of td, it is desirable to know the duration tr 334 of the response packet 345. Calculating the duration tr 334 is straightforward as the duration of the response packet 345 is defined in the Standard. In practice therefore, airborne measuring station 110 can calculate the value of td from expression (3):

$$td=(Th-Tc-tr-t_{SIFS})/2 \qquad (2)$$

and hence the corresponding distance, $D=td*c$ (3)

Stated another way, airborne measuring station 110 begins transmission of ranging packet 340 at a beginning transmission time Ta 311 and ends transmission of the ranging packet 340 at an ending transmission time Tc 312. Target station 120 begins receiving the first ranging packet 340 at a beginning reception time Tb 321 and receives the complete first ranging packet 340 at an ending reception time Td 322, wherein td is the time between the ending transmission time Tc 312 and the ending reception time Td 322.

A reception window Trw 360 may be defined which may be related to the range of the target station 120. The reception window starts at time Ts 310 after the end of the transmission, Tc 312 of ranging packet 340 and ends at time Tt 320 after the end of the transmission, Tc 312 of ranging packet 340. As an example, the reception window Trw 360 may be set to start at time Ts 310, 10 μs after time Tc 312, and end at time Tt 320, 110 μs after time Tc 312. In this example the duration of the reception window Trw 360 is 100 μs.

Figure 4:
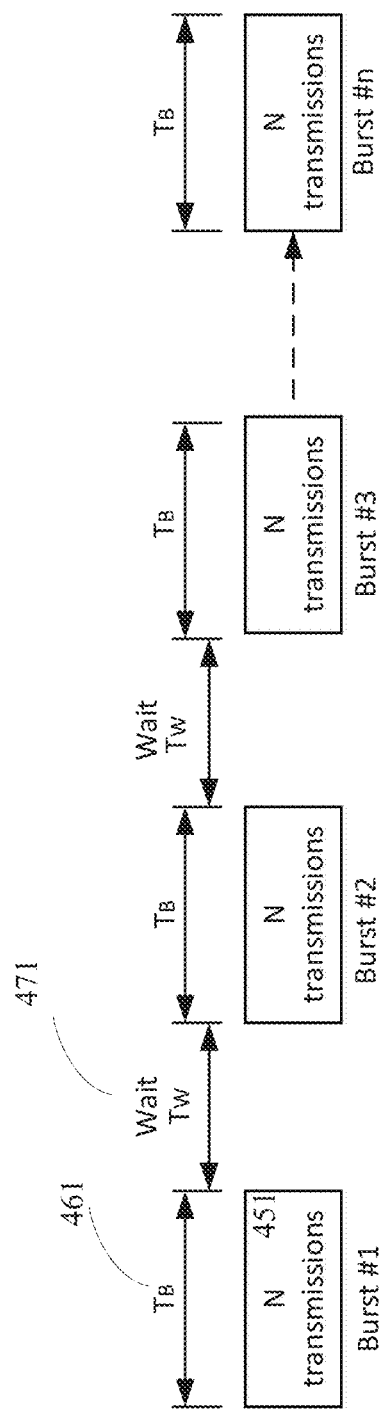
FIG. 4 is a timing diagram of a series of bursts of transmissions of the ranging packets.

FIG. 4 is a timing diagram of a series of bursts of transmissions of the ranging packets 340. In one embodiment of this disclosure, a "burst", 451, consisting of a preset number N of transmissions of ranging packets 340 from airborne measuring station 110, may be sent followed by a "wait" period, Tw 471. This sequence may continue until a command may be issued to terminate the transmissions. Within each burst, each of the N transmissions may be separated by a preset time, Tp 350. The duration TB 461 of each burst will therefore be N Tp. For example, a burst may consist of 100 transmissions of ranging packets 340 from airborne measuring station 110, each transmission, say, 1 ms apart, followed by a wait period of, for example, 30 ms after which another burst of 100 transmissions may be sent. In this example the duration $T_B$ 461 of each burst will be 100 ms.

In cases where there is a single airborne measuring station 110, then the three measuring distances D1 130, D2 140 and D3 150 may be taken at different points in time. In this case the airborne measuring station 110 may be flying over an area and periodically transmitting the ranging packets 340, receiving the response packets 345 and calculating the delay time td. Over time, the location of target station 120 can be calculated with increasing accuracy as more measurements are taken by the airborne measuring station 110 from varying positions. Such calculations are well known.

As mentioned previously, the packet exchange may be any pair of packets where an automatic response packet is sent. Commonly used packets in Wi-Fi include an RTS/CTS exchange and a Data (null)/ACK exchange.

In one embodiment of the present disclosure, a single airborne measuring station 110 is used. A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of OFDM ACK and CTS packets in response to data null and RTS packets respectively.

OFDM waveforms, used in Wi-Fi, use coherent receive processing with the following example steps:
1. Detecting the presence of an OFDM waveform in a received sample stream.
2. Establishing OFDM symbol boundaries for channel estimation, carrier frequency offset (CFO) estimation, and Fast Fourier transform FFT operations.
3. Equalization of received symbols to correct channel and frequency offset effects.
4. Demodulation and decoding of physical layer PHY header and medium access controller MAC payload symbols.
5. De-scrambling MAC payload using scrambler seed extracted from decoded bits.

In some embodiments, the OFDM waveform preamble is defined in the IEEE Standard as a 320-sample sequence composed of a Short Training Field and Long Training Field, each 160 samples long. The Short Training Field (STF) is typically used by receivers for initial packet detection, automatic gain control (AGC) convergence, and coarse synchronization. The Long Training Field (LTF) is typically used by receivers to refine synchronization and to estimate the channel frequency response. The LTF waveform was designed to have good autocorrelation properties with reasonable peak-to-average power.

Examples of two correlation schemes that may be utilized to detect OFDM waveforms include cross correlation and autocorrelation. Cross correlation compares received samples to a local copy of the preamble waveform searching for a match. Autocorrelation compares recently-received samples to previously-received samples searching for the preamble's known periodicity. Cross correlation has an advantage of only considering one vector of noisy samples, computing the correlation metric by multiplying this vector by a noiseless copy of the transmitted waveform. However cross correlation suffers in the presence of realistic wireless degradations including carrier frequency offset CFO and multipath fading. Autocorrelation is robust to CFO and multipath fading as each copy of a training symbol is subjected to identical degradations, thereby preserving the waveform's underlying periodicity. However, autocorrelation suffers from the extra noise admitted by computing a correlation metric using two vectors of received, noisy, samples.

Cross correlation provides the better performance with respect to receive sensitivity than autocorrelation but the performance will degrade significantly in the presence of CFO. The IEEE 802.11 Standard requires transmit center frequency accuracy of ±20 ppm.

Decoding the OFDM payload is further complicated by scrambling. According to the IEEE 802.11 Standard, a pseudo-random 7-bit scrambling seed is used for each 802.11 OFDM packet. The OFDM receiver recovers this seed from the scrambled service field in the first OFDM symbol following the Signal field. However, if a bit error occurs in the decoded service field, the descrambled payload will be totally in error. The probability of a bit error in the service field becomes higher as the SNR decreases. Hence, if attempting to detect an OFDM CTS or ACK packet at low or negative SNR levels, there is a high probability that one or more bits in the service field may be in error and the scrambler seed may not be recoverable.

As discussed above, a preamble detector using cross correlation provides the better SNR sensitivity or receive signal sensitivity, but the sensitivity degrades with CFO. A brute force solution to the CFO problem is described that includes a branched preamble correlator using multiple parallel cross correlators, "branches", each tuned to a different CFO within the range of offsets permitted by the IEEE 802.11 Standard.

Assuming a carrier frequency of 5.815 GHz, channel 161 at the top end of the Wi-Fi 5 GHz band, a 20 ppm error is 116.3 kHz. For an ACK packet of 44 µs duration, the 1 ppm error is 0.0128 µs, a 7.6% error for the last bit. Hence, in order to not excessively degrade the cross correlation of the packet, the CFO error may be restrained to be less than, say, 5 ppm. In one embodiment of this disclosure the number of parallel cross correlators branches selected is eight resulting in 8 parallel preamble correlators which may, for example, be tuned to [−17.5, −12.5, −7.5, −2.5, +2.5, +7.5, +12.5, +17.5] ppm. To reduce further the CFO error, the number of branches selected may be sixteen, resulting in 16 parallel preamble detectors, which may, for example, be tuned to [−18.75, −6.25, −13.75, −11.25, −8.75, −6.25, −3.75, −1.25, +1.25, +3.75, +6.25, +8.75, +11.25, +13.75, +16.25, +18.75] ppm.

Figure 5:
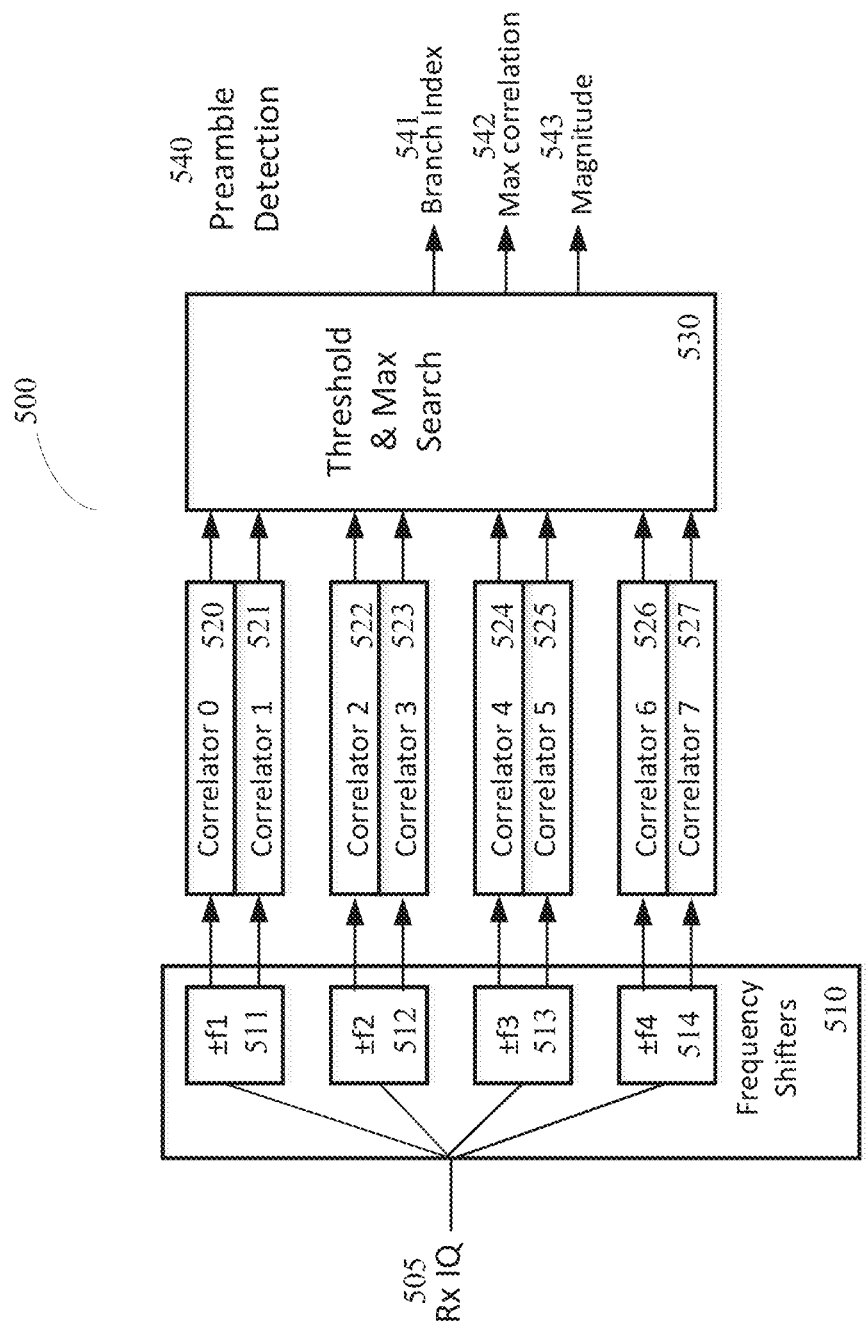
FIG. 5 is a functional block diagram of an exemplar OFDM branched correlator for one embodiment of this disclosure where the number of parallel cross correlators branches selected is eight.

FIG. 5 is a functional block diagram of an exemplar OFDM branched preamble detector 500, e.g., correlator, for one embodiment of this disclosure where the number of parallel cross correlators branches selected is eight. The complex received baseband sampled stream 505 is inputted to a frequency shifters block 510. The frequency shifters block 510 comprises four frequency shifters 511, 512, 513, and 514. Each frequency shifter 511, 512, 513 and 514 is configured with an independent frequency shift value and outputs two sample streams, one with a positive frequency shift and one with a negative frequency shift. The eight frequency-shifted sample streams are each fed into an independent correlator 520, 521, 522, 523, 524, 525, 526, and 527, implementing a complex cross correlation searching for all or part of the 802.11 OFDM response packet 345. Each correlator 520 to 527 re-computes a complete complex cross correlation in every sample period. The output of each correlator 520 to 527 is the raw correlation coefficients for the duration of a reception window 360. The eight normalized correlation metrics are inputted to the Threshold and Max Search block 530. The same correlation threshold may be applied to every branch. When any branch exceeds this threshold a search process may begin. This search process may run for a fixed time during which the logic selects the largest correlation metric from any branch. When the search is complete the detector may report the preamble detection 540 with the branch index 541 with the highest correlation value, the maximum raw correlation value 542, and corresponding magnitude value 543.

The IEEE 802.11 Standard allows frequency offsets of ±20 ppm. In the branched preamble example detector depicted in FIG. 5, an eight-branch architecture is shown such that evenly distributed branches would achieve acceptable performance across this ±20 ppm range at the highest 5 GHz center frequencies. The eight branches may be tuned at 5 ppm spacing for the received channel center frequency.

Figure 6:
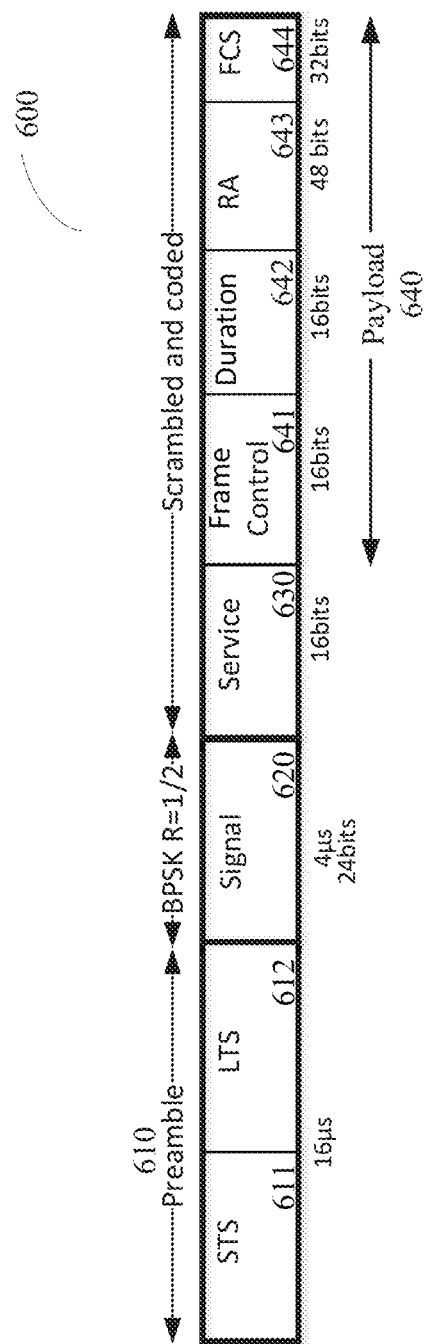
FIG. 6 is the format for CTS and ACK OFDM packets which may be the response packet.

FIG. 6 is an example format for CTS and ACK OFDM packets 600, which may be the response packet 345. As described in the IEEE 802.11 Standard, the 12 symbol, OFDM preamble 610, comprising the short timing sequence (STS) 611 and the long timing sequence (LTS) 612, is followed by the 1 symbol signal field 620. The Signal field 620 is modulated BPSK (binary phase shift keying) with rate 1/2 convolutional coding. The Signal field 620 consists of the following sub-fields: Rate (4 bits), Reserved (1 bit), Length (12 bits) Parity (1 bit) and Tail (6 bits). The values of each bit in the Signal field 620 for a CTS or ACK packet, responding to a known RTS or data null packet, are known. There are a total of 48 coded data bits in the OFDM Signal field 620. These bits represent a unique 48-bit sequence for 6 Mbps OFDM ACK and CTS packets. The Signal field 620 is followed by the 16 bit service field 630 with bits 0-6 set to zero followed by 9 reserved bits. The service field 630 is followed by the payload 640 comprising the frame control field 641, the duration field 642 the receiver address RA field 643 and the frame check sum FCS 644. Bits 0-6 of the service field 630 are transmitted first and are used to synchronize the descrambler in the receiver, as described in the IEEE 802.11 Standard. The transmit 7 bit scrambler seed is random, but, because the first 7 pre-scrambled bits are zero, the receiver can effectively recover the seed. If, however, there is a bit error in those first 7 bits, then the receiver cannot effectively recover the seed and cannot decode correctly the rest of the packet following the service field 630, including, in particular, the payload containing the frame control field 641 and the RA field 643.

Figure 7:
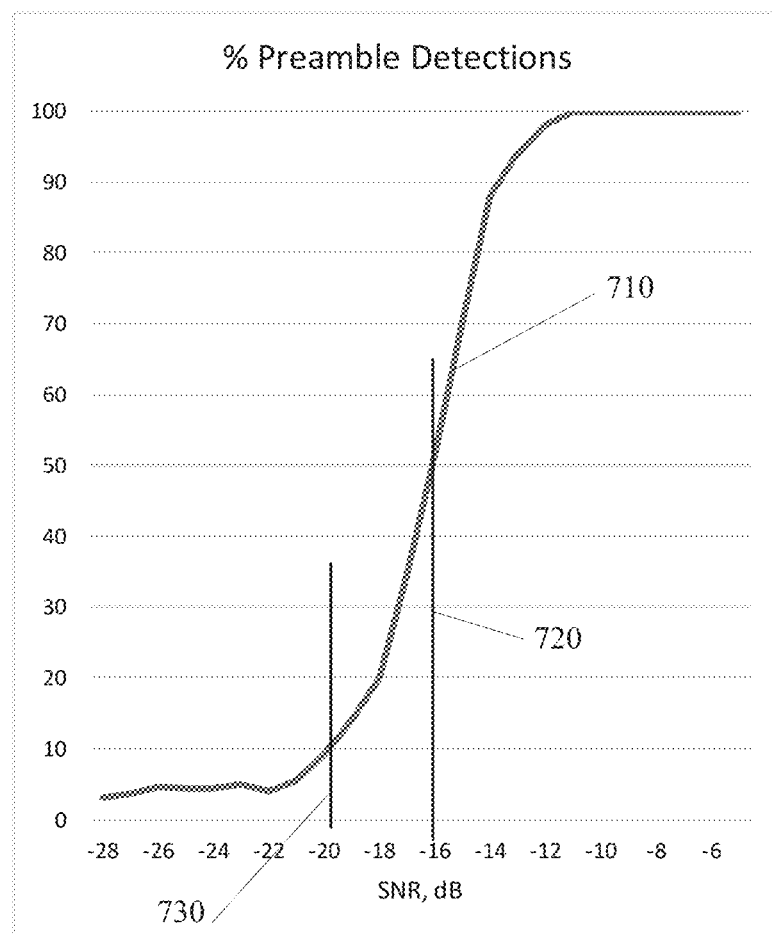
FIG. 7 is a graphical representation of the percentage of OFDM preamble detections with varying SNR for thermal noise conditions.

FIG. 7 is a graphical representation of the percentage of OFDM preamble detections 710 with varying SNR for thermal noise conditions. At about −16 dB SNR, 720, 50% of the preambles are detected and at about −20 dB SNR, 730, only about 10% may be detected. The received signal level may be calculated using the standard formula:

$$Pr=10 \log(1000 \text{ K T})+10 \text{ Log } BW+NF+SNR \text{ dBm} \quad (4)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for OFDM and assuming NF=3 dB, from (4)
Pr=−98+SNR dBm (assuming no implementation losses)
Hence, theoretically at a wanted received level of about −114 dBm, the wanted preamble may be detected about 50% of the time.

Figure 8:
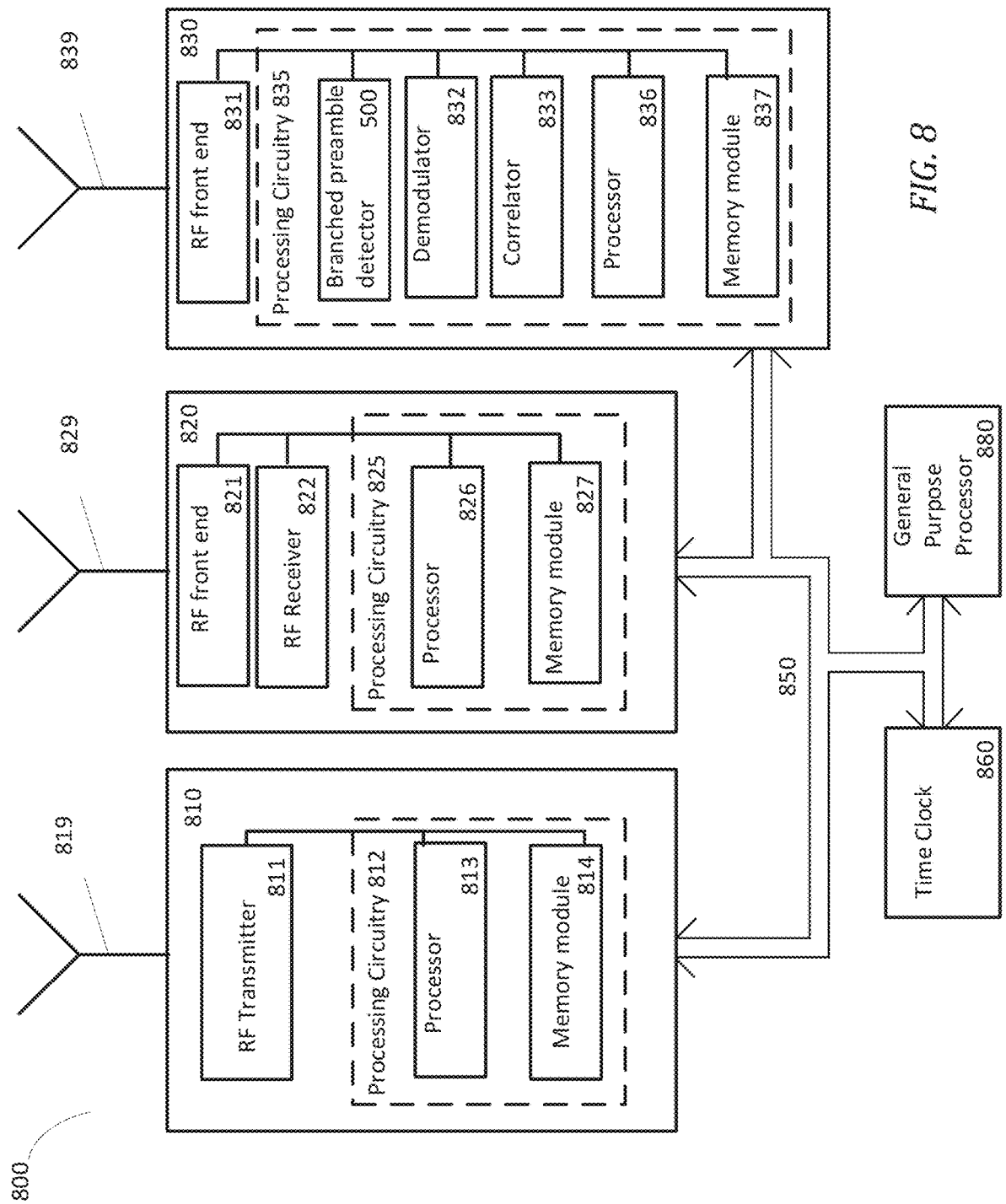
FIG. 8 illustrates a block diagram of an example wireless communication device which, according to an embodiment of the disclosure, may be used as all or as part of the measuring station.

FIG. 8 illustrates a block diagram of an example wireless communication device 800 which, according to an embodiment of the disclosure, may be used as all or as part of the measuring station 110.

The wireless communication device 800 may be any device capable of wirelessly receiving signals and transmitting signals and may be configured to execute any of the methods of the IEEE 802.11-2016 Standard. Wireless communication device 800 may be one or more wireless devices that are based upon the IEEE 802.11 specification and each may be configured to act as a transmitter or a receiver. The embodiment described herein is that where wireless communication device 800 includes a wireless transmitter 810, a first wireless receiver 820 and a second wireless receiver 830. The wireless communication device 800 may also include a time clock 860 and a general purpose processor 880 which are interconnected to the three wireless devices 810, 820 and 830 by a data bus 850.

In some embodiments, the wireless transmitter 810 includes an RF transmitter 811 and processing circuitry 812 that includes processor 813, and memory module 814. The wireless transmitter 810 may also include one or more wireless antennas such as antennas 819. The RF transmitter 811 may perform the functions of scrambling, encoding, interleaving, mapping pilot insertion, IFFT (inverse fast Fourier transform), guard interval insertion and I-Q modulation as described in IEEE 802.11-2106, and amplification for the transmission of the OFDM packets via the antenna 819. In some embodiments the processing circuitry 812 and/or the processor 813 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some functions of the RF transmitter 811 may be performed by the processing circuitry 812. The processing circuitry 812 may be configured to control any of the methods and/or processes described herein and/or to cause such methods, and/or processes to be performed, e.g., by the RF transmitter 811. The memory module 814 may be configured to store data, programmatic software code and/or other information described herein. In some embodiments, the software may include instructions that, when executed by the processing circuitry 812, causes the processing circuitry 812 to perform the processes described herein with respect to the wireless transmitter 810.

In some embodiments, the wireless receiver 820 includes an RF front end 821, an RF receiver 822, processing circuitry 825 that includes a processor 826 and a memory module 827, and one or more wireless antennas such as wireless antenna 829. The RF front end 821 may perform the usual functions of an RF receiver front end such as low noise amplification, filtering, and frequency down conversion so as to condition the received signal suitable for inputting to the RF receiver 822. The RF receiver 822 may perform the Wi-Fi OFDM functions of I-Q demodulation, guard interval removal, FFT (fast Fourier transform), pilot removal, de-interleaving, de-mapping, decoding and descrambling so as to condition the received signal suitable for inputting to the processing circuitry 825. In some embodiments, the RF receiver 822 and/or the processing circuitry 825 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, some or all of the functions of the RF receiver 822 may be performed by the processing circuitry 825. The processing circuitry 825 may be configured to control any of the methods and/or processes described herein and/or to cause such methods, and/or processes to be performed, e.g., by the wireless receiver 820. The memory module 827 is configured to store data, programmatic software code and/or other information described herein. In some embodiments, the software may include instructions that, when executed by the processing circuitry 825, causes the processing circuitry 825 to perform the processes described herein with respect to the wireless receiver 820.

In some embodiments, the receiver station 830 includes an RF front end 831, processing circuitry 835 that includes a branched preamble detector 500, a demodulator 832, a correlator 833 a processor 836 and a memory module 837, and one or more wireless antennas such as wireless antenna 839. Of note, although FIG. 8 shows the branched preamble detector 500, demodulator 832 and correlator 833 as elements that are separate from the processor 836 and memory module 837, implementations are not limited to such. It is contemplated that one of more of the branched preamble detector 500, demodulator 832 and correlator 833 can be implemented using the processor 836 and the memory module 837. The RF front end 831 may perform the usual functions of an RF receiver front end such as low noise amplification, filtering, and frequency down conversion so as to condition the received signal suitable for inputting to the processing circuitry 835. The conditioned received signal may first be inputted to the branched preamble detector 500. The branched preamble detector 500 may perform the preamble detection as discussed above with reference to FIG. 5. The detected output from the branched preamble detector 500 may then be inputted to the demodulator 832 that may perform the Wi-Fi OFDM functions of I-Q demodulation, guard interval removal, FFT (fast Fourier transform), pilot removal, de-interleaving, and de-mapping, so as to condition the received signal suitable for inputting to the correlator 833. The correlator 833 may perform the function of correlating to all the 304 conditioned, demodulated received bits with 128 versions of the scrambled and coded bit stream. The processor 836 may be configured to control any of the methods and/or processes described herein and/or to cause such methods, and/or processes to be performed, e.g., by the wireless receiver 830. The memory module 837 is configured to store data, programmatic software code and/or other information described herein. In some embodiments, the software may include instructions that, when executed by the processing circuitry 835, causes the processing circuitry 835 to perform the processes described herein with respect to the wireless receiver 830. In some embodiments the processing circuitry 835, may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions.

According to this embodiment of the disclosure, the wireless receiver 820 may be configured to measure and monitor an input signal's attribute, such as may include one or more of a ranging signal transmitted by wireless transmitter 810, data and control packets, and the response signal, including control packets, transmitted by an access point or station that may be based upon the IEEE 802.11-2016 Standard. Such packets may include data null, ACK, RTS and CTS packets. The memory module 827 may store instructions for executing any method mentioned in the IEEE 802.11-2016 Standard, input signals, and results of processing by the processor 826, signals to be outputted and the like.

According to an embodiment of the disclosure, the RF transmitter 811 may be configured to transmit signals and the processing circuitry 812 may be configured to prepare the transmitted signal attributes based upon the IEEE 802.11-2016 Standard. Such transmitted packets may include data packets, control packets and management packets that are to be transmitted by a wireless station that is based upon the IEEE 802.11. Such control packets may include RTS and data null packets. The memory module 814 may store instructions for executing any method mentioned in the specification, input signals, and results of processing by the processor 813, signals to be outputted and the like.

According to another embodiment of the disclosure, the wireless receiver 820 may be configured to receive the transmissions of the transmissions of the wireless transmitter 810 and the processing circuitry 825 may be configured to monitor the attribute of the transmissions and determine the value of the time of departure of the transmissions from the wireless transmitter 810. These times may be accomplished by outputting a trigger that is timed to coincide with the reception packet from the wireless transmitter 810. This trigger may then be used to read the time from the time clock 860. Time clock 860 may have a precision that is higher than the internal TSF timer that is part of the wireless receiver 820.

According to an embodiment of the disclosure, the wireless transmitter 810 may be configured to transmit packets to another wireless communication device and the processing circuitry 812 may be configured to prepare the attributes of the packet to be transmitted.

According to another embodiment of the disclosure, the wireless receiver 830 may be configured to receive the transmissions of another target station 120 via, e.g., wireless communication, and the processing circuitry 835 may be configured to monitor an attribute of the transmissions of the other wireless communication device, and determine the value of the time of arrival of packets from the other wireless communication device. These times may be accomplished by outputting a trigger that is timed to coincide with the reception packet from the other target station 120, e.g., wireless device or the wireless transmitter 810. This trigger may then be used to read the time from the time clock 860. Time clock 860 may have a precision that is higher than the internal timer that is part of the wireless receiver 830.

According to an embodiment of the disclosure, a general purpose processor 880 may be used to control the operations of the wireless communication device 800 and in particular wireless transmitter 810, the wireless receiver 820, and wireless receiver 830. The general purpose processor 880 may also carry out the various calculations as described in this disclosure and may also prepare the measurement results for disclosure to an operator or user. In some embodiments, the general purpose processor 880 can be a computing device such as a tablet computer, desktop computer, laptop computer, or distributed computing, e.g., cloud computing. In some embodiments, the general purpose processor 880 can be a processor/CPU in the tablet, laptop computer, desktop computer, or distributed computing environment, etc. In some embodiments, the general purpose processor 880 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 800 can be included in a single physical device/housing or can be distributed among several different physical devices/housings. Processor 880 may be used to perform the various calculations as described in this disclosure and may also prepare the measurement results for disclosure to an operator or user.

Figure 9:
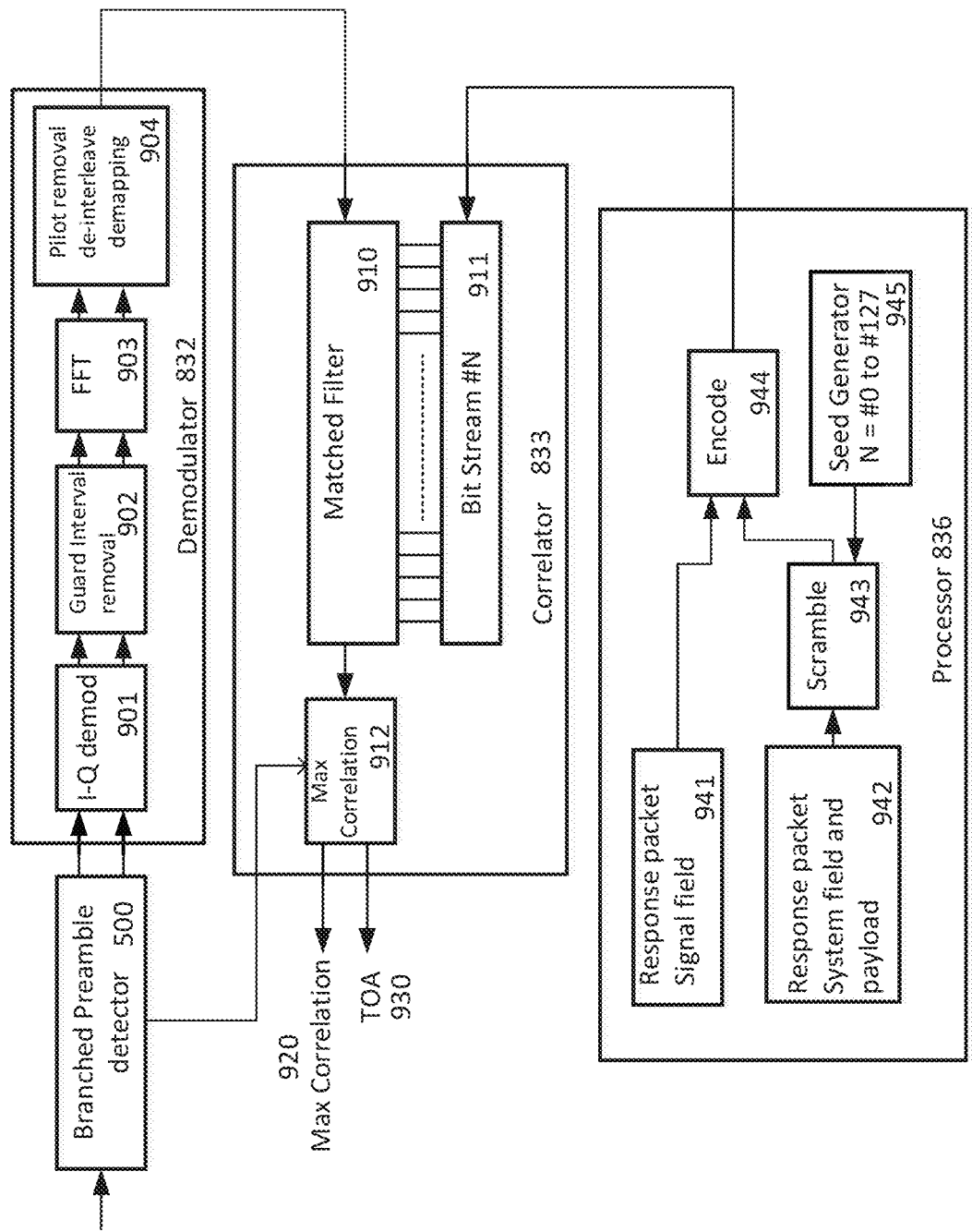
FIG. 9 is a functional block diagram of an example of the functional blocks that may be used in a receiver that correlates the 304 raw bits of the complete CTS or ACK packet.

FIG. 9 is a functional block diagram of an example of the functional blocks that may be used in a receiver 830 that correlates the 304 raw bits of the complete CTS or ACK packet as discussed above with reference to FIGS. 6 and 7. The received signal is detected by the branched preamble detector 500 and then demodulated in demodulator 832. Demodulator 832 may perform the OFDM demodulation functions including I-Q demodulation 901, guard interval removal 902, FFT 903 and pilot removal, de-interleaving and de-mapping 904 as described in the IEEE 802.11-2016 Standard. The demodulator 832 outputs the detected, demodulated raw bit stream which may be inputted to the correlator 833. In this embodiment, in the processor 836 the expected raw bits for the entire expected response packet 345 are constructed. The response packet system field and payload bits are constructed in block 942 and then scrambled in block 943 with a seed that is inputted from block 945. The response packet Signal field is constructed in block 941. In block 944, the Signal field bits are added to the scrambled system field and payload bits and then encoded. In this embodiment, in the correlator 833 the received raw bits from the demodulator 832 are correlated in the matched filter 910 with the expected 304 bit stream 911 from the processor 836. The maximum correlation 920 is detected in block 912 and outputted together with the TOA 930. In order to correlate against all 128 scrambler seeds, the matched filter 910 may hold the detected demodulated bits while the processor 836 generates each of the 304 bit streams corresponding to each of the scrambler seeds in turn, or, alternatively 128 parallel correlators, comprising matched filter 910 and bit stream 911, may be used and the processor 836 generates all 128 scrambled bit streams, one for each correlator.

As will be appreciated by one of skill in the art, the method of using parallel correlation where all 128 bit streams are matched at one time, or serial correlation where each of the 128 bit streams is matched in turn, is known. The maximum correlation 920 for each of the seeds may be outputted and if a set of parallel correlators is used, the largest correlation would be selected. If a serial correlation scheme is used, the largest correlation after all 128 seeds have been used may be selected or, if, for any seed, a correlation exceeds a set correlation threshold, as discussed above with reference to FIG. 7, a match may be declared and the rest of the seeds may not be produced.

The process of "additive correlation" across bursts is now described.

As described above with reference to FIG. 5 a series of bursts of transmissions may be used. "Additive correlation" exploits the likelihood that the wanted response packets 345 will occur at the same time in each reception window 360 for each of the N transmissions during a burst. The process is to combine the results from all the windows in a burst so as to accumulate the wanted correlation peaks that occur around the same time in each window while rejecting the other unwanted correlation peaks which will be occurring at random times in each window.

As discussed above with reference to FIG. 3, the correlation may be performed for the duration of a reception window Trw 360. As an example the duration of a reception window may be 100 µs. As discussed above with reference to FIG. 5 if an OFDM preamble is detected, then the rest of the packet may be demodulated. An ACK or a CTS has 304 bits and therefore, if a preamble is detected then the next 304 bits are demodulated before another preamble detection may occur. Therefore, in a reception window of 100 µs, a maximum of three preamble detections is possible. If a spurious preamble, due to noise, is detected less than 44µ before the wanted packet would have been received, then the wanted packet would be effectively blocked.

Figure 10:
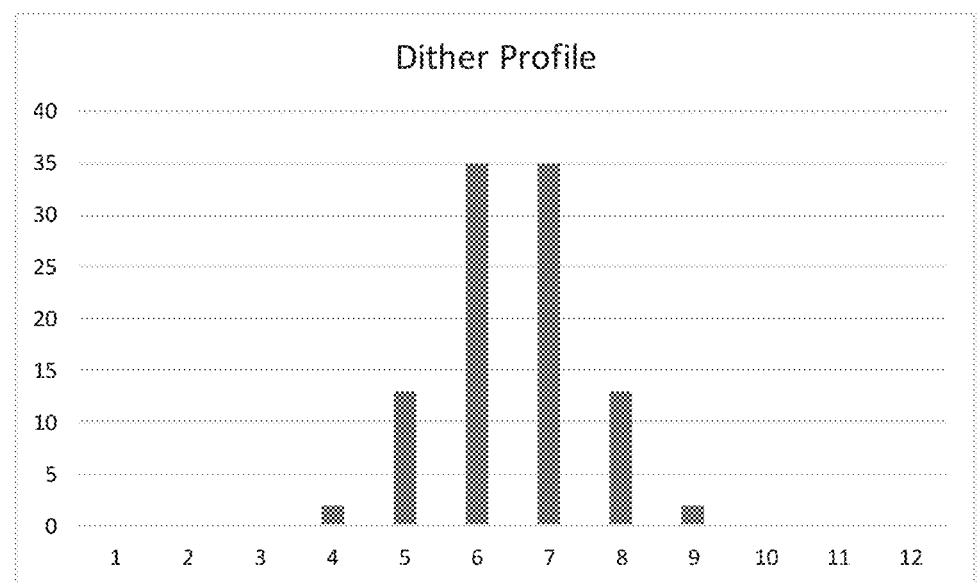
FIG. 10 is a histogram of a typical dither profile of a Wi-Fi target station.
Figure 11:
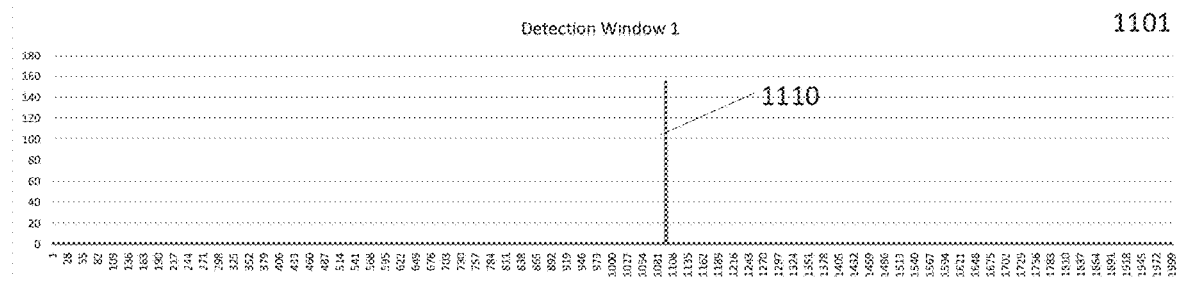
FIGS. 11, 12, 13, and 14, are graphical representations of the output of a correlator across reception windows of a burst.
Figure 12:
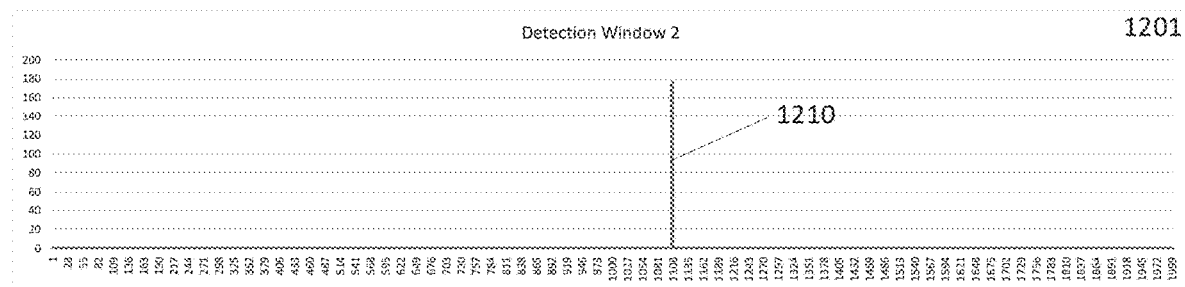
Figure 13:
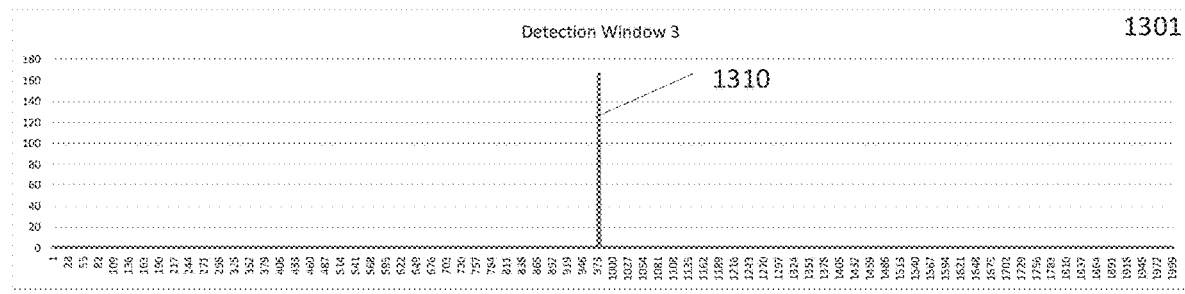
Figure 14:
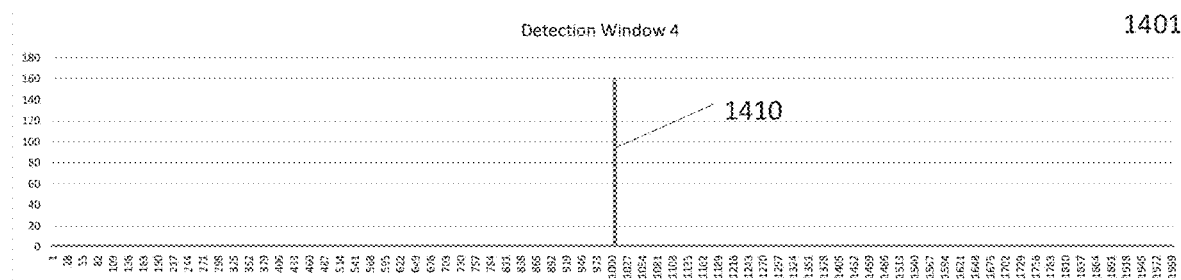

In the general sense, Wi-Fi target stations, 120, will exhibit a dither in their turnaround time, ($t_{SIFS}$) 332, resulting in a jitter, Tv, between the relative timing of the correlation peaks. FIG. 10 is a histogram of a typical dither profile of a Wi-Fi target station 120.

In each reception window, n, of the burst of N, a set of correlation values, Cn, are derived:

$$Cn = \{C_{n1}, C_{n2}, \ldots C_{nW}\}$$

where W is the number of samples in the reception window

Additive correlation, ac, is the sum of all the reception windows in a burst of N, $$\text{For } i=1 \text{ to } W, \; ac_i = \Sigma_{n=1}^{N} c_{ni} \qquad (5)$$

where W is the number of samples in the additive reception window, and

N is the number of packets in a burst.

Figure 15:
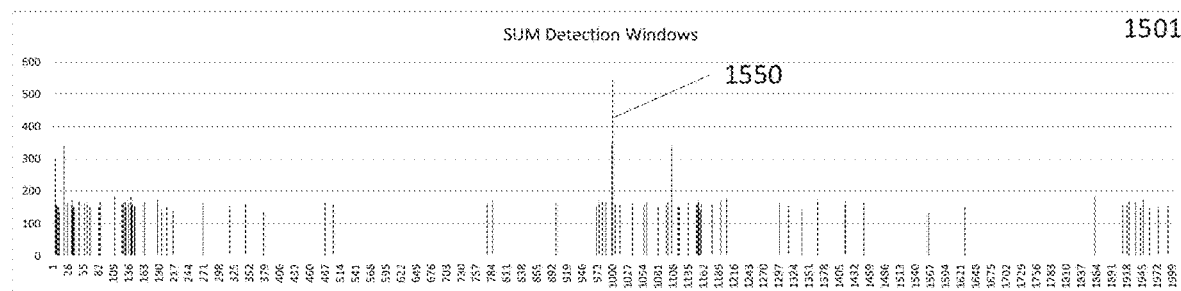
FIG. 15 is a graphical representation of the summation of detection windows.

FIGS. 11, 12, 13, and 14 are graphical representations of the maximum correlation 920 output of correlator 833 across reception windows 360 of a burst 451. Plots 1101, 1201, 1301, and 1401 are the outputs of four reception windows in a burst. The x-axis is the samples, from 1 to W, where W=2000, and the y-axis is the number of matching bits in the correlation. As discussed above with reference to FIG. 9, the maximum correlation is outputted per reception window, and hence, for each reception window, there is just one peak correlation. Of the four peak correlations 1110, 1210, 1310, and 1410, only peak 1410 in plot 1401 is for the wanted signal. In this example, where the wanted signal strength was in the order of −113 dBm, of the 100 reception windows, in only 6 of the 100 reception windows was the peak the wanted peak and in 69 of the reception windows a spurious correlation due to noise occurred prior to 44 μs before the time that the wanted signal may have been received and hence blocked the wanted reception. Referring to FIG. 15, plot 1501 is the sum of the 100 reception windows and peak 1550 is the peak of the summation, which corresponds to the wanted signal.

Figure 16:
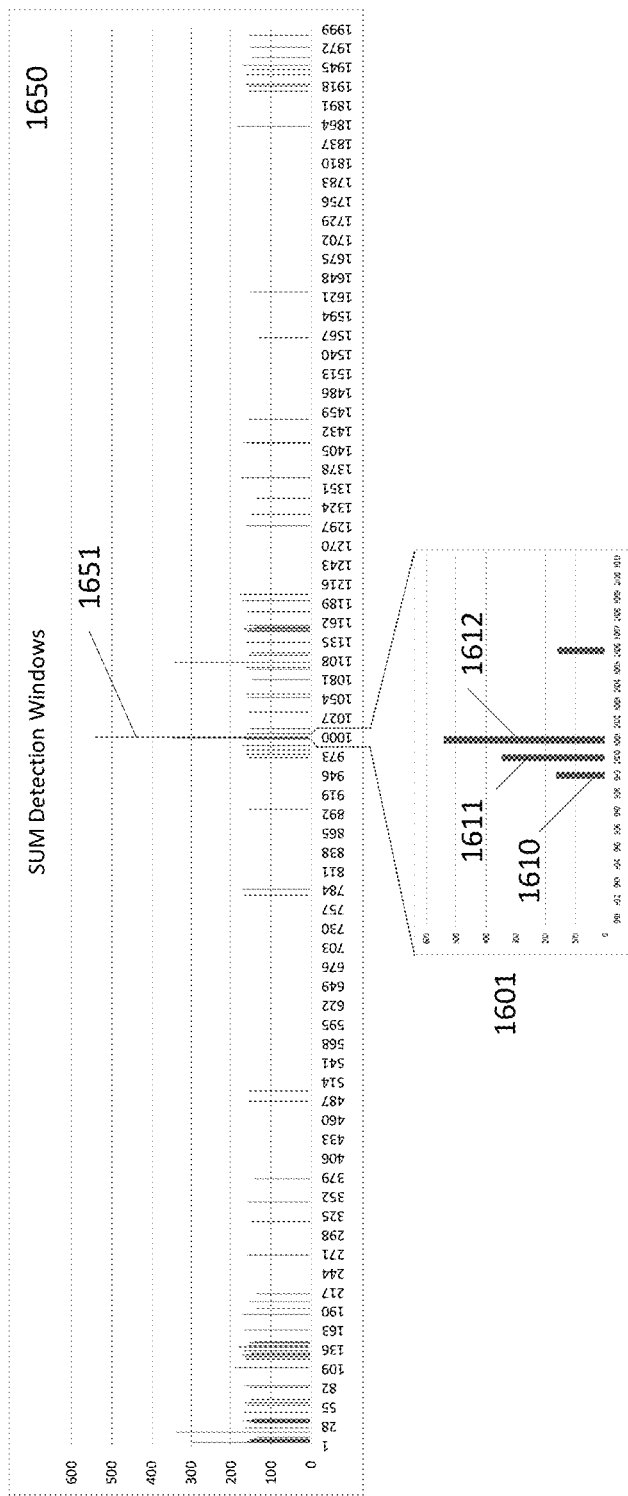
FIG. 16 is a graphical representation of the summation of the detection windows shown in FIG. 15 together an expanded view of the plot around the wanted peak.

FIG. 16 is a reproduction of plot 1501, the summation of the detection windows in a burst, including those shown in FIGS. 11, 12 13, and 14. Plot 1601 is an expanded view of the plot 1650 around the wanted peak 1651. Due to the dither of the target station 120, as discussed above with reference to FIG. 10, the simple summation process results in a number of peaks 1610, 1611, and 1612.

In one embodiment of this disclosure a rolling sum, RS, may be applied to the additive correlator, $ac_i$.

$$\text{For } i = \frac{(s-1)}{2} \text{ to } W - \frac{(s-1)}{2} \quad RS_i = \sum_{i-\frac{(s-1)}{2}}^{i+\frac{(s-1)}{2}} ac_i \quad (6)$$

Where s is the rolling sum window, the number of samples that are summed so as to cover the expected dither of the target station 120.

Figure 17:
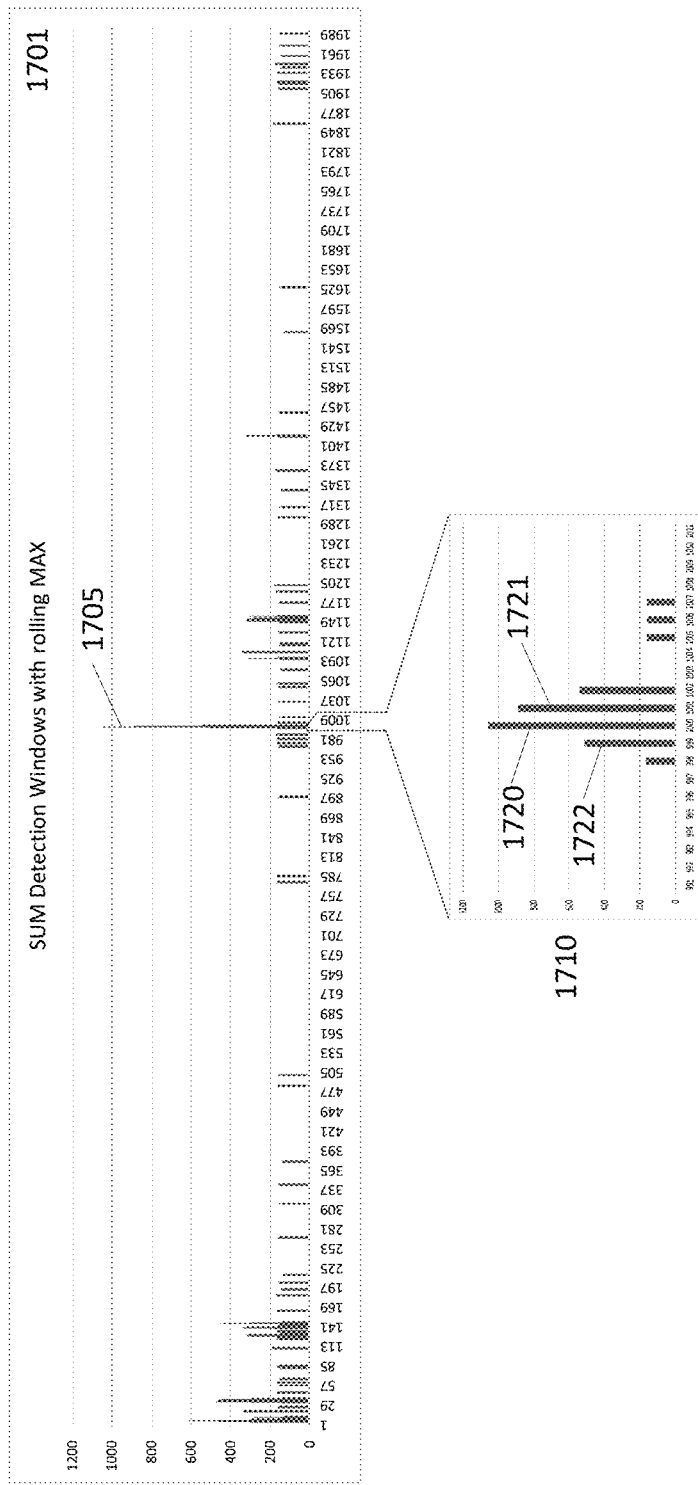
FIG. 17 is a graphical representation of the summation of the same correlations as per FIG. 16, but where a rolling sum is applied to the additive correlation.

FIG. 17 is a graphical representation 1701 and 1710 of the summation of the same correlations that resulted in plots 1650 and 1501 but where a rolling sum is applied to the additive correlation as described above with reference to formula (6). Summing the 100 correlations, after applying the rolling sum, results in the wanted peak 1705. It may be noted that the peak 1705 is significantly higher that the peak 1651. Plot 1710 is an expanded view of the graphical representation 1701 and shows that due to the dither of the target station 120, as discussed above with reference to FIG. 10, there are still a number of peaks but because of the application of the rolling sum, the individual peaks 1610, 1611, and 1613 noted in plot 1601 are now summed. In this example, a rolling sum window with s=3 is used. Hence, the maximum peak, 1720 is the sum of peaks 1610, 1611 and 1613, and similarly peak 1721 is the sum of peaks 1611 and 1613. Peak 1722 is the sum of peaks 1610 and 1611. Thus peak 1720 is the maximum of peak 1705 and is about twice as large as the peak 1651.

Figure 18:
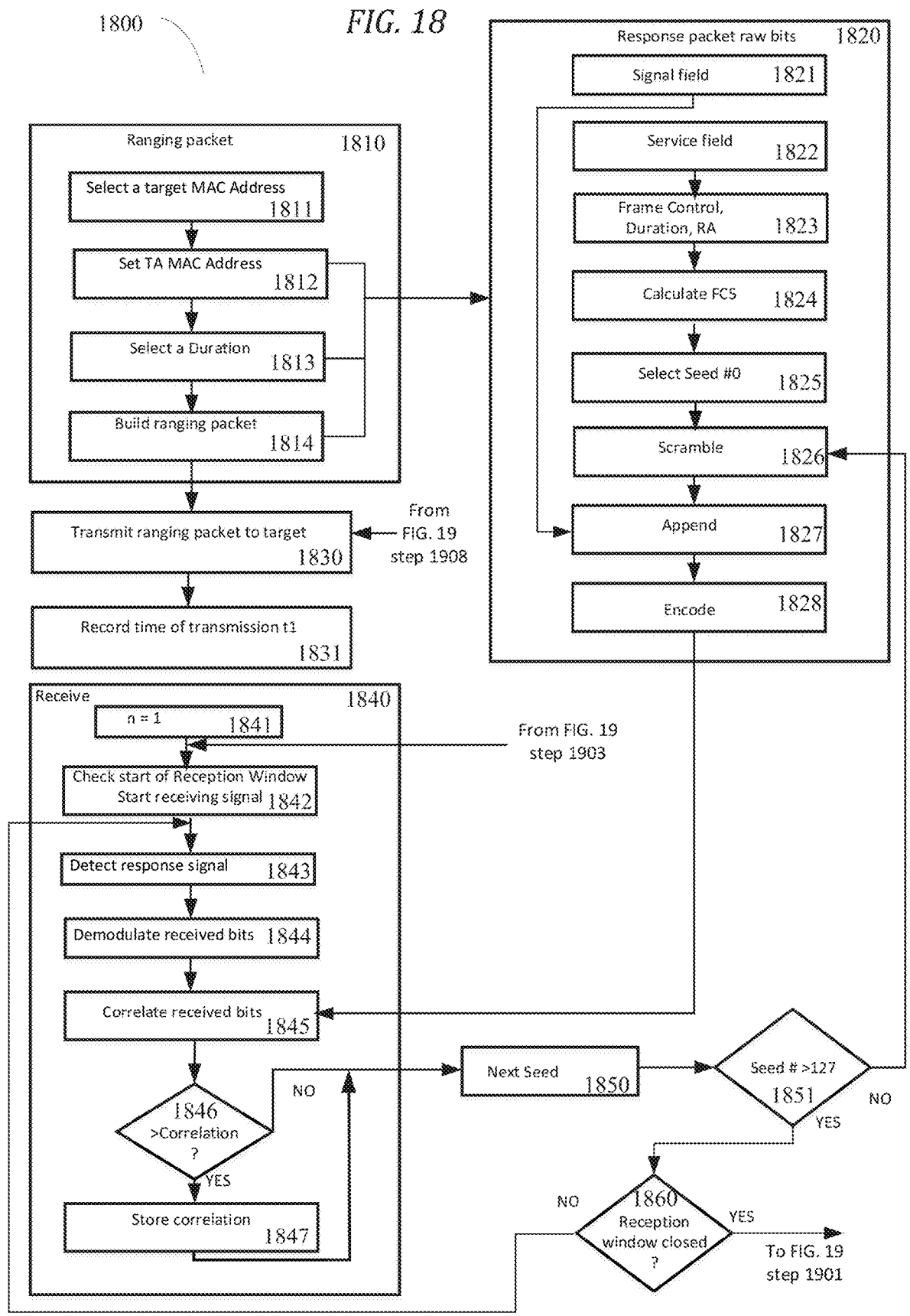
FIGS. 18 and 19 is a flow diagram of process of an example of an embodiment of the disclosure that correlates the received raw coded and scrambled bits of the response packet with each of the 127 possible descrambled bit streams, selects the maximum correlation for each reception window, sums all the reception windows in a burst, applies a rolling sum window and selects the peak.
Figure 19:
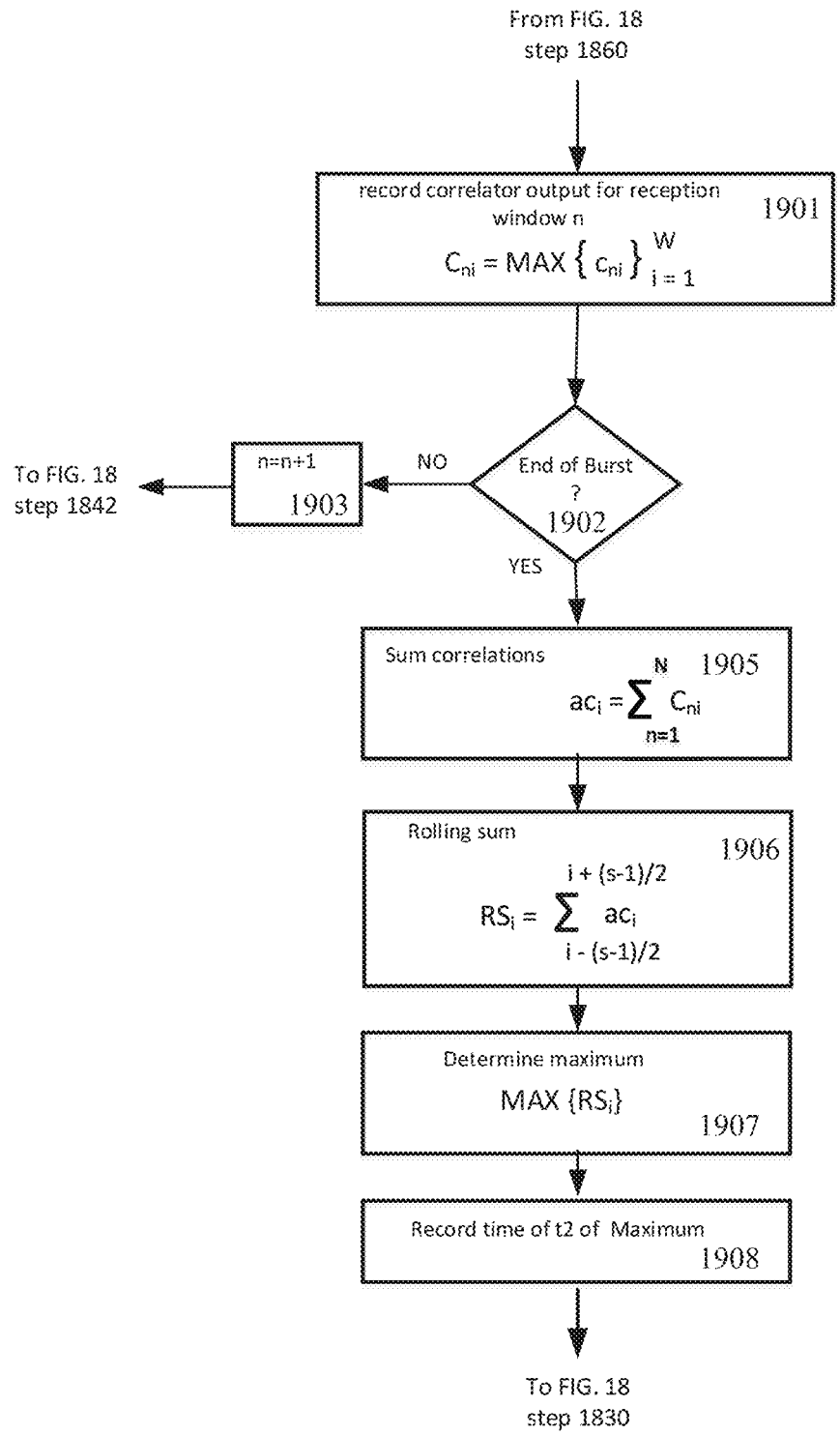

FIGS. 18 and 19 are a flow diagram of process 1800 of an example of an embodiment of the disclosure that correlates the received raw coded and scrambled bits of the response packet 345 with each of the 127 possible descrambled bit streams, selects the maximum correlation for each reception window, sums all the reception windows in a burst, applies a rolling sum window and selects the peak. The process 1800 includes step 1810, where the ranging packet 340 is constructed. The ranging packet 340 may be constructed by the processing circuitry 812 based upon input from the general purpose processor 880. Step 1810 may start with step 1811 where the MAC address of the target station 120 is selected. This selection may be based upon an input from the general purpose processor 880 and performed by the processing circuitry 812. At step 1812, the MAC address to be used in the ranging packet 340 is set. In the ranging packet 340, which may be an RTS or a data null, this MAC address will be the TA Address. The selection of the TA may be based upon an input from the general purpose processor 880 and performed by the processing circuitry 812. In the corresponding response packet 345, this MAC address will be the RA field 643. At step 1813, a duration value is selected for the MAC header of the ranging packet 340. This sets the value of the duration field 642 expected in the response packet 345. The selection of the duration value may be based upon an input from the general purpose processor 880 and performed by the processor 813. At step 1814, the MAC header and payload for the ranging packet 340 is constructed. Step 1810 may be followed by step 1830 where the ranging packet 340 may be transmitted. Step 1830 may include taking the MAC Header and payload constructed in step 1814, adding the preamble and header, and then scrambling, encoding and modulating the bits as described in the IEEE 802.11 Standard and as discussed in reference to FIG. 6. The process of taking the MAC Header and payload constructed in step 1814, adding the preamble and header, and then scrambling, encoding and modulating the bits may be performed by the processing circuitry 812 in the wireless transmitter 810. The transmission of the ranging packet 340 may be performed by the RF transmitter 811. At step 1831, the time t1 of transmission of the ranging packet 340 is recorded. The recoding of the time t1 of transmission of the ranging packet 340 may be performed by the wireless receiver 820.

The process 1800 may include step 1820 where the expected raw bits for the response packet 345 are determined. The determination of these raw bits may be performed by the processor 836 and memory module 837, and may be based upon inputs from the general purpose processor 880 and/or the processing circuitry 812. Step 1820 may start with step 1821 where the 24 raw bits of the signal field 620 (rate, length and parity) are set. At step 1822, the service field may be constructed by block 941 part of the processor 836. At step 1823, the frame control, duration, and RA fields are constructed. The frame control field 641 will be set to correspond to the type of response packet 345 that is expected, e.g., CTS or ACK. The duration field 642 will correspond to the duration set in the request packet at step 1813. The RA field 643 will correspond to the TA MAC address set in step 1812. At step 1824, the 16 bit FCS field 644 is calculated over the frame control, duration, and RA fields. At step 1825, the initial scrambler seed may be selected. The IEEE 802.11 Standard specifies that the scrambler is initiated with a pseudorandom nonzero seed, hence the initial scrambler seed that may be selected may be, for example, 0000001 binary. At step 1826, the service 630 and payload 640 fields are scrambled using the scrambler seed selected in step 1825. The process may include step 1827 where the signal field from step 1821 is appended to the scrambled service and payload fields from step 1826 forming a 152 bit sequence. At step 1828, the 152 bit sequence formed in step 1827 is encoded to create the 304 bit sequence that corresponds to the expected received packet 345 assuming it was scrambled using the seed selected in step 1825.

The process 1800 may include step 1840 where it is determined if a response packet 345 is received. The response packet may be received by wireless receiver 830. At step 1841, a value n is initialized, where n indicates the reception window in a burst of N, and, at step 1842, a check is made that the start of the reception window Trw 360 has occurred, i.e., a time of Ts 310 has elapsed since the end of the transmission of the ranging packet 340 in step 1830. This timing and decision may be made by processor 836 based upon an input from the processing circuitry 825 in receiver 820. At step 1843, the incoming preamble of the received signal is detected, as discussed above with reference to FIG. 5. The incoming preamble signal may be detected by the branched preamble detector 500. At step 1844, the detected packet is demodulated. The demodulation may be performed by demodulator 832. The first 304 demodulated bits may represent the expected raw bits of the response packet 345. At step 1845, as discussed above with reference to FIG. 7, the 304 bits of the detected and demodulated response signal may be correlated against the 304 bit stream obtained from step 1828. This correlation may be performed by correlator 833. At step 1846, it is determined if the correlation resulting from the correlation process performed in step 1845 and as discussed above with reference to FIG. 7, is greater than any previous correlations in this reception window. If n=1, and for the initial seed, as set in step 1825, then the value of the correlation, i.e., the number of matching bits, is then stored at step 1847 together with the ToA t2 of that packet. The time t2 may be determined by the processing circuitry 835 and may include input from the time clock 860.

The process may include step 1850 where another scrambler seed is selected. The selection of the next scrambler seed may be a simple increment from the previous. The selection of scrambler seeds may be performed by the processing circuitry 835. At step 1851, it is checked if all the 127 scrambler seeds have been used. If not, then, at step 1826, the service 630 and payload 640 fields are scrambled using the scrambler seed selected in step 1850. If at step 1851, it is determined that all 128 scrambler seeds have been used, then, at step 1860, a check is made if the reception window Trw 360 has closed, i.e., a time Tt has elapsed since the end of the transmission of the ranging packet 340 in step 1830. If the reception window is still open, then, at step 1843, a new preamble may be detected. Step 1851 continues to check if the reception window Trw 360 has closed, and if the process is at step 1843 when the reception window closes, then the process advances to FIG. 19, step 1901.

Hence, when a reception window opens, as determined by step 1842, and a preamble is detected, at step 1843, the next 304 bits are demodulated (step 1844) and then correlated (step 1845) against each of the 127 scrambler seeds, in turn (steps 1850, 1851 and 1860). The highest correlation is determined and stored (steps 1846 and 1847) for that first packet reception in the reception window. The process returns to step 1843 and, if another preamble is detected, then again, the next 304 bits are demodulated (step 1844) and then correlated (step 1845) against each of the 127 scrambler seeds, in turn. At steps 1846 and 1847, the higher correlation is determined, for each of the 127 scrambler seeds such that the highest correlation out of all the detected and demodulated packets in the reception window is determined. When the reception window closes, at step 1860, the process advances to step 1901 and the highest peak, from step 1847 is recorded. For reception window n, the recorded correlation, $C_{ni}$, is For $i=1$ to $W$, $C_{ni}=MAX\{c_{ni}\}$ At step 1902, a check is made to determine if the burst of N transmissions of ranging packets 340 has ended. If, at step 1902, it is determined that the burst has not ended then, at step 1903, n is incremented, and the process returns to step 1842 where another ranging packet 340 is transmitted. Several methods may be used to determine if the burst has ended. One method may include noting the value of the variable n and if n=N, then the burst has ended. To account for the possibility that the transmission of a ranging packet 340 may have been missed by receiver 820, then a check may be made of the elapsed time since the time, t1, recorded in step 1831, of the received ranging packet 340 and if this elapsed time is greater than, for example, 3 Tp, then it may be assumed that the burst is complete. As the wait time Tw 471 between bursts is usually much greater than Tp 350, then choosing a multiple of Tp to determine if the burst is complete is straightforward. In addition, not receiving the transmitted ranging packet 340 should be a rare event. The determination whether the burst has ended may be performed by the processing circuitry 835 in the wireless receiver 830.

If, at step 1902, it is determined that the burst is complete, then step 1902 may be followed by step 1905 where the sum of the correlations, ac, for each sample i in the reception window, is determined as per equation (5) and as discussed above with reference to FIG. 11.

For $i=1$ to $W$, $ac_i = \Sigma_{n=1}^{N} C_{ni}$ where W is the number of samples in the additive reception window, and N is the number of packets in a burst Step 1905 may be followed by step 1906 where the rolling sum window is applied to the summed correlations, as described above with reference to equation (6):

For $$i = \frac{(s-1)}{2} \text{ to } W - \frac{(s-1)}{2}$$

$$RS_i = \sum_{i-\frac{(s-1)}{2}}^{i+\frac{(s-1)}{2}} ac_i$$

Where s=samples in the rolling sum window

Step 1906 may be followed by step 1907 where the maximum of the rolling sum RM is determined, maximum=MAX $\{RS_i\}$, as discussed above with reference to FIG. 13. The time t2 of the maximum value determined in step 1907 is then recorded in step 1908. The value of the maximum, the ToD t1, and ToA t2 are then used in the geo-location calculations. The process may then return to step 1830 where a new burst of ranging packets is transmitted. The calculations in Steps 1901 to 1908 may be carried out by the processor 836 and/or the general purpose processor 880.

As discussed above with reference to FIG. 17, the value of the maximum determined in step 1907 is effectively the sum of a number of correlations of the wanted signal where the value is in matched bits. For example, the peak 1705 in FIG. 17 is about 1,020 and represents the sum of 6 wanted correlations. The value of the sum may be used as an estimation that the sum is indeed a wanted signal and not due to false noise correlations. A value of 500 or 600 may be used as a threshold such that sums below that value are assumed to be noise and not passed to the geo-location calculations. Higher values may be used to indicate a stronger confidence factor that the peak value is indeed that of a wanted response correlation.

Figure 20:
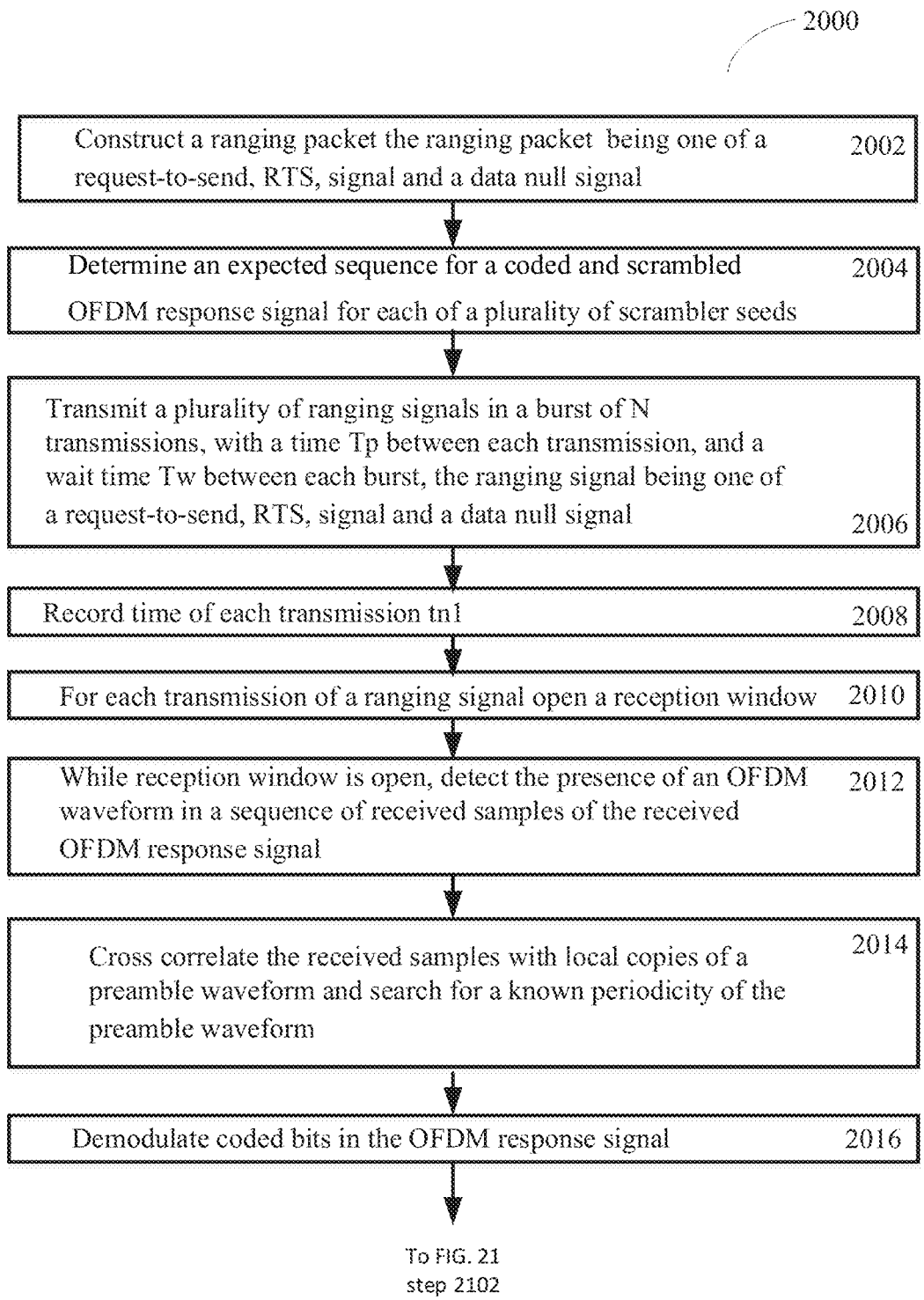
FIGS. 20 and 21 is a flowchart of an of an example process that correlates the received raw coded and scrambled bits of the response packet with each of the 127 possible descrambled bit streams, selects the maximum correlation for each reception window, sums all the reception windows in a burst, applies a rolling sum window and selects the peak.
Figure 21:
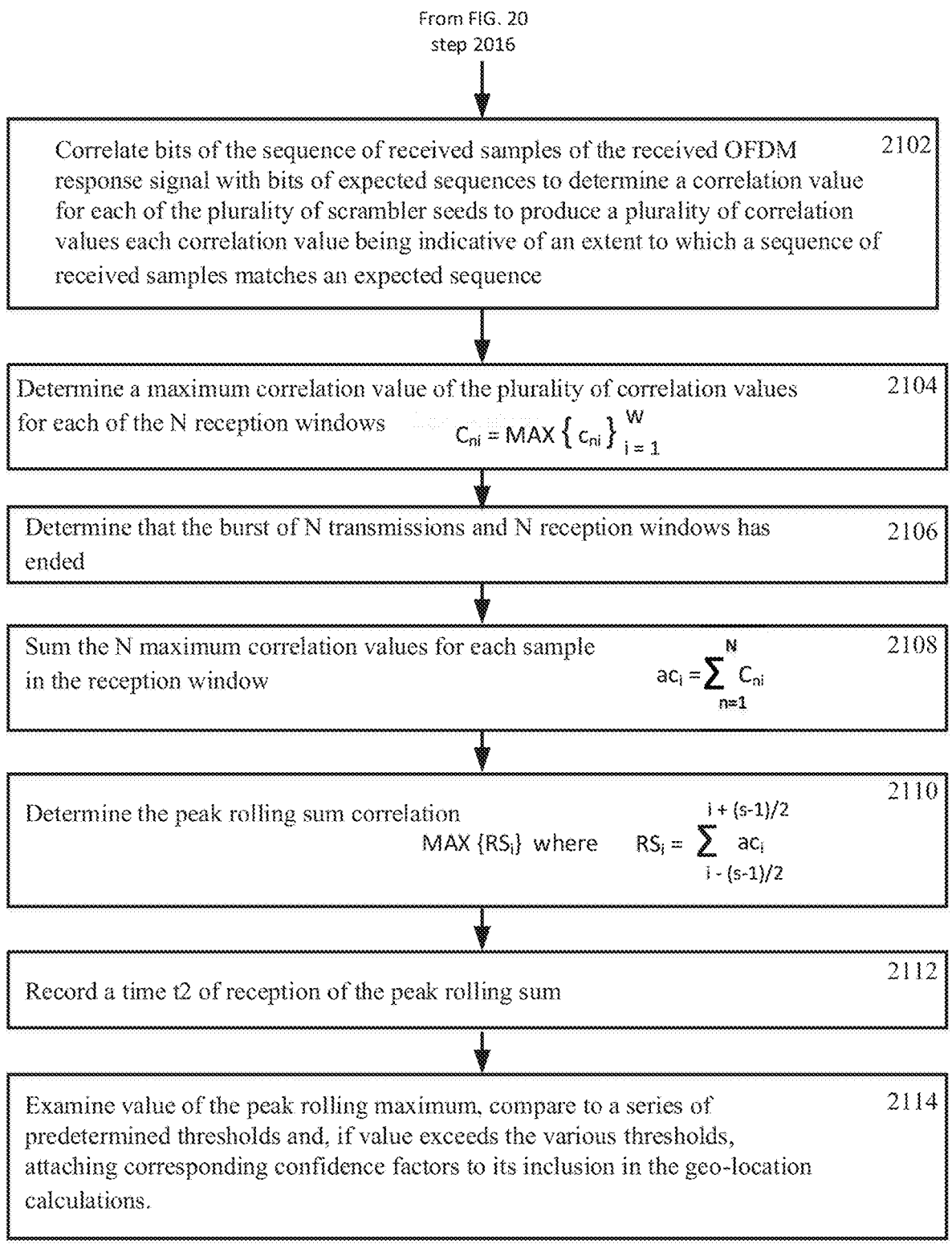

FIGS. 20 and 21 are a flowchart 2000 of an of an example process that correlates the received raw coded and scrambled bits of the response packet 345 with each of the 127 possible descrambled bit streams, selects the maximum correlation for each reception window, sums all the reception windows in a burst, applies a rolling sum window and selects the peak. The process includes constructing a ranging packet 340, the ranging packet being one of a request-to-send, RTS, signal and a data null signal (step 2002) and determining an expected sequence for a coded and scrambled OFDM response signal (response packet 345) for each of a plurality of scrambler seeds (step 2004). Transmitting, via the RF transmitter 811, a plurality of ranging packets 340 in a burst of N transmissions, with a time Tp 350 between each transmission, and a wait time Tw 471 between each burst (step 2006), and recording a time, tn1, via wireless receiver 820, of each transmitted ranging signal (step 2008) and, after a time of Ts 310, opening a reception window of duration Trw 360 (step 2010). During the time that the reception window Trw is open, the process further includes receiving, via wireless receiver 830 the presence of an OFDM waveform in a sequence of received samples of the received OFDM response signal (step 2012). The received samples are then, via branched preamble detector 500, cross correlated with local copies of a preamble waveform to search for a known periodicity of the preamble waveform (step 2014). The coded bits in the OFDM response signal are then demodulated, via the RF receiver 830 demodulator 832 (step 2016).

Continuing to FIG. 21, via the correlator 833 of processing circuitry 835, the bits of the sequence of received samples of the received OFDM response signal are correlated with the bits of expected sequences to determine a correlation value for each of the plurality of scrambler seeds to produce a plurality of correlation values, each correlation value being indicative of an extent to which a sequence of received samples matches an expected sequence (step 2102). A maximum correlation value, $C_{ni}$, of the plurality of correlation values for each of the N reception windows in a burst 451 is then determined, via processing circuitry 835 (step 2104). The process further includes determining that the burst of N transmissions, and N reception windows has ended (step 2106) and then summing, via processing circuitry 835, the N maximum correlation values for each sample in the reception window, $ac_i = \Sigma_{n=1}^{N} C_{ni}$ (step 2108). The process then includes, via processing circuitry 835, determining the peak rolling sum correlation MAX{$RS_i$} where $$RS_i = \sum_{i-\frac{(s-1)}{2}}^{i+\frac{(s-1)}{2}} ac_i$$

(step 2110) and recording a time of reception t2 of the peak value of the rolling sum (step 2112). The process further includes, step 2114, examining the value of the peak rolling sum correlation and comparing it to a series of predetermined thresholds. If the value exceeds the various thresholds, outputting the time of reception t2, and attaching corresponding confidence factors to its inclusion in the geo-location calculations. For example, the following confidence levels may be used for various peak correlations:

Peak <500, confidence zero,
500>Peak <700, confidence 1,
700>Peak <1000, confidence 2,
1000>Peak <2000, confidence 3,
Peak >2000, confidence 4.

Figure 22:
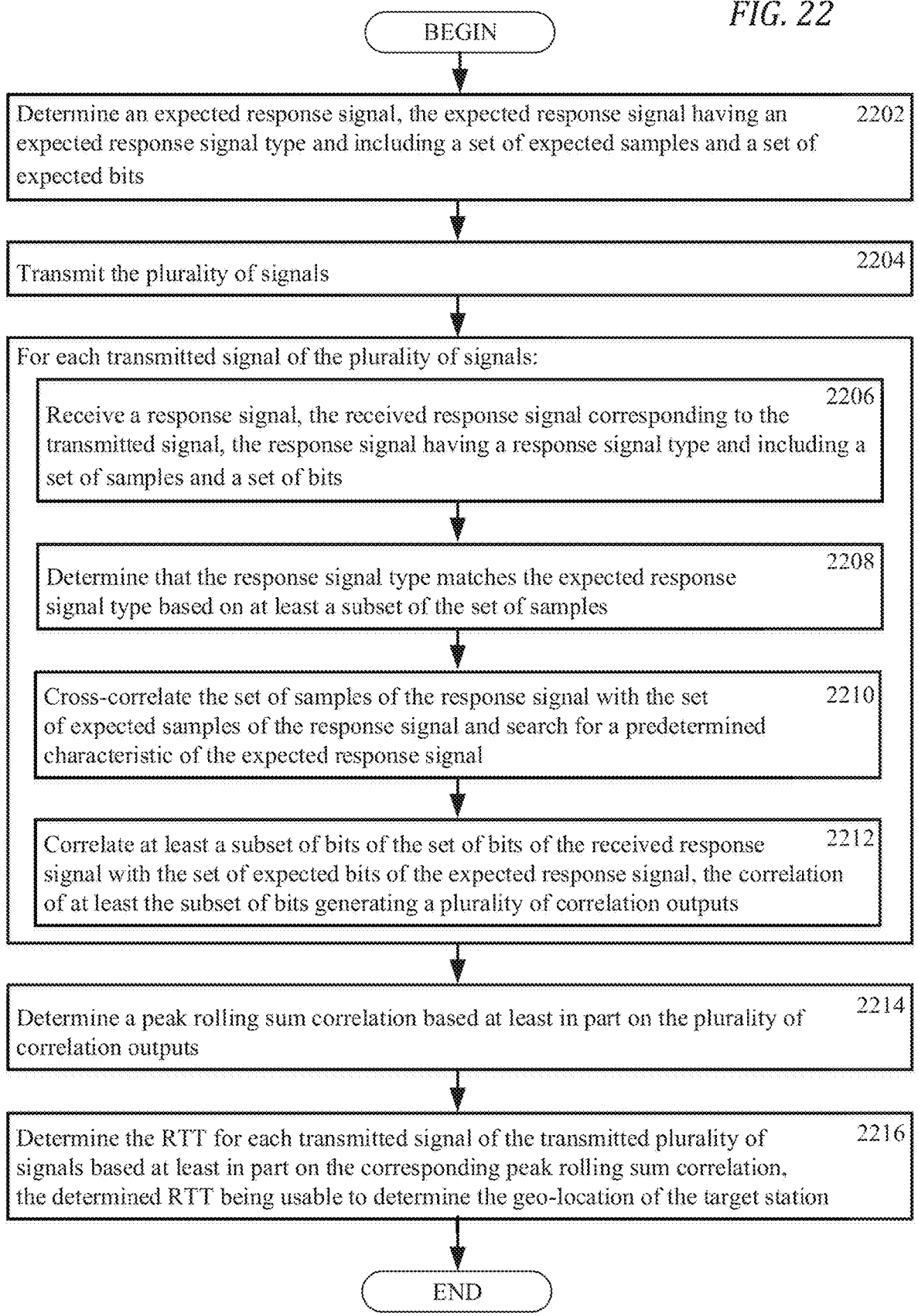
FIG. 22 is a flow diagram of an example process 2200 for determining a geo-location of a target station using RTTs of a plurality of signals transmitted by a WD to the target station and a plurality of response signals received from the target station corresponding to the plurality of signals transmitted by the WD according to some embodiments of the present disclosure.

FIG. 22 is a flow diagram of an example process 2200 for determining a geo-location of a target station using RTTs of a plurality of signals transmitted by a wireless device (WD) to the target station and a plurality of response signals received from the target station corresponding to the plurality of signals transmitted by the WD according to some embodiments of the present disclosure. At step 2202, an expected response signal is determined. The expected response signal has an expected response signal type and includes a set of expected samples and a set of expected bits. At step 2204, the plurality of signals is transmitted.

Steps 2206-2212 may be performed for each transmitted signal of the plurality of signals. At step 2206, a response signal corresponding to the transmitted signal is received. The response signal has a response signal type and includes a set of samples and a set of bits. At step 2208, the example process includes determining that the response signal type matches the expected response signal type based on at least a subset of the set of samples. At step 2210, the set of samples of the response signal are cross-correlated with the set of expected samples of the response signal, and a predetermined characteristic of the expected response signal is searched for. At step 2212, at least a subset of bits of the set of bits of the received response signal is correlated with the set of expected bits of the expected response signal. The correlation of at least the subset of bits generates a plurality of correlation outputs.

At step 2214, a peak rolling sum correlation is determined based at least in part on the plurality of correlation outputs. Further, at step S2216, the RTT for each transmitted signal of the transmitted plurality of signals is determined based at least in part on the corresponding peak rolling sum correlation. The determined RTT is usable to determine the geo-location of the target station.

The following is a list of nonlimiting embodiments.

Embodiment 1. A method in a first wireless device (WD), the method comprising:

transmitting a plurality of ranging signals and recording a time of each transmission;

determining an expected bit sequence for a coded and scrambled OFDM response signal for each of a plurality of scrambler seeds;

opening a reception window after each transmission;

while the reception window is open:

receiving an orthogonal frequency division multiplexing (OFDM), response signal transmitted from a second WD in response to the ranging signal;

detecting the presence of an OFDM waveform in a sequence of received samples of the received OFDM response signal;

cross-correlating the received samples with local copies of a preamble waveform and searching for a known periodicity of the preamble waveform;

demodulating bits in the OFDM response signal;

correlating bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence; and determining a maximum correlation value of the plurality of correlation values;

summing the correlation values for each sample in the reception windows;

determining the peak value of the sum of the correlation values; and determining a time t2 of the reception of the peak value.

Embodiment 2. The method of Embodiment 1, wherein the method further comprises:

transmitting a plurality of ranging signals in a burst of N transmissions, with a time Tp between each transmission, and with a wait time Tw between each burst;

detecting that the burst of N transmissions has ended;

summing the maximum correlation values for each sample in the reception windows.

Embodiment 3. The method of Embodiment 2, wherein the method further comprises:

calculating a rolling sum of the sum of the N maximum correlation values;

determining the peak value of the rolling sum;

determining a time t2 of the reception of the peak value of the rolling sum.

Embodiment 4. The method of Embodiment 1, wherein each transmitted ranging signal is one of a request-to-send, RTS, signal and a data null signal.

Embodiment 5. The method of Embodiment 1, further comprising:

using a branched preamble detector using multiple cross correlators in parallel branches, each cross correlator tuned to a different carrier frequency offset (CFO) to produce the plurality of correlation values, each CFO being within a range of offsets permitted by an IEEE 802.11 Standard;

determining the branch that produces a largest correlation; and estimating the CFO based upon the branch that produces the largest correlation.

Embodiment 6. The method of Embodiment 1, further comprising determining parameters of the ranging signal by at least one of:

selecting a WD receiver address (RA) to be used as a medium access control (MAC) address of the second WD;

selecting a MAC address to be used as a wireless transmitter address (TA); and selecting a duration value for the duration of the reception window.

Embodiment 7. The method of Embodiment 3, wherein the rolling sum value RS is defined as:

For $$i = \frac{(s-1)}{2} \text{ to } W - \frac{(s-1)}{2}$$

$$RS_i = \sum_{i-\frac{(s-1)}{2}}^{i+\frac{(s-1)}{2}} ac_i$$

where s=samples in the rolling sum window,

W=number of samples in the reception window, and, for $i=1$ to $W$, $ac_i = \sum_{n=1}^{N} C_{ni}$ where $N$ is the number of packets in a burst, $C_{ni} = \text{MAX}\{c_{ni}\}$ where $c_{ni}$ is the correlation value for ith sample in reception window n.

Embodiment 8. The method of Embodiment 3, further comprising:

comparing the value of the peak rolling sum to a series of predetermined thresholds; and if value exceeds the various thresholds:

outputting the time of reception t2, and attaching corresponding confidence factors to its inclusion in the geo-location calculations.

Embodiment 9. A first wireless device (WD), comprising:

a transmitter configured to transmit a plurality and record a time of each transmission;

processing circuitry in communication with the transmitter, the processing circuitry configured to:

determine an expected bit sequence for a coded and scrambled OFDM response signal for each of a plurality of scrambler seeds;

open a reception window after each transmission; and while the reception window is open:

receive an orthogonal frequency division multiplexing (OFDM), response signal transmitted from a second WD in response to the ranging signal;

detect the presence of an OFDM waveform in a sequence of received samples of the received OFDM response signal;

cross-correlate the received samples with local copies of a preamble waveform and searching for a known periodicity of the preamble waveform;

demodulate coded bits in the OFDM response signal;

correlate bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence;

determine a maximum correlation value of the plurality of correlation values;

summing the correlation values for each sample in the reception windows;

determine the peak value of the sum of the correlation values;

determine a time t2 of the reception of the peak value.

Embodiment 10. The first WD of Embodiment 9, wherein the transmitter is further configured to:

transmit a plurality of ranging signals in a burst of N transmissions, with a time Tp between each transmission, and with a wait time Tw between each burst;

and the processing circuitry is further configured to:

detect that the burst of N transmissions has ended; and sum the maximum correlation values for each sample in the reception windows.

Embodiment 11. The first WD of Embodiment 9, wherein the processing circuitry if further configured to:

calculate a rolling sum of the sum of the N maximum correlation values;

determine the peak value of the rolling sum;

determine a time t2 of the reception of the peak value of the rolling sum.

Embodiment 12. The first WD of Embodiment 9, wherein each transmitted ranging signal is one of a request-to-send, RTS, signal and a data null signal.

Embodiment 13. The first WD of Embodiment 9, wherein the processing circuitry is further configured to use a branched preamble detector using multiple cross correlators in parallel branches, each cross correlator tuned to a different carrier frequency offset (CFO) to produce the plurality of correlation values, each CFO being within a range of offsets permitted by an IEEE 802.11 Standard;
determine the branch that produces a largest correlation; and
estimate the CFO based upon the branch that produces the largest correlation Embodiment 14. The first WD of Embodiment 9, wherein parameters of the ranging signal are determined by at least one of:
selection of a WD receiver address (RA) to be used as a medium access control (MAC) address of the second WD;
selection of a MAC address to be used as a wireless transmitter address (TA); and
selection of a duration value for the duration of the reception window.

Embodiment 15. The first WD of Embodiment 10 wherein the processing circuitry is further configured to
determine the rolling sum value RS:
For $$i = \frac{(s-1)}{2} \text{ to } W - \frac{(s-1)}{2}$$

$$RS_i = \sum_{i-\frac{(s-1)}{2}}^{i+\frac{(s-1)}{2}} ac_i$$

where s=samples in the rolling sum window,
W=number of samples in the reception window, and, for $i=1$ to $W$, $ac_i = \Sigma_{n=1}^{N} C_{ni}$ where $N$ is the number of packets in a burst, $C_{ni} = \text{MAX}\{c_{ni}\}$ where $c_{ni}$ is the correlation value for ith sample in reception window n.

Embodiment 16. The first WD of Embodiment 9, wherein the processing circuitry is further configured to compare the value of the peak rolling sum to a series of predetermined thresholds; and
if value exceeds the various thresholds:
output the time of reception t2 and attach corresponding confidence factors to its inclusion in the geo-location calculations.

Embodiment 17. An airborne station, comprising:
a transmitter configured to:
transmit a plurality of ranging signals in a burst of N transmissions, with a time Tp between each transmission, and a wait time Tw between each burst, a ranging signal being one of a request-to-send, RTS, signal and a data null signal;
record the time of each transmission; and
a receiver configured to:
open a reception window after each transmission, and while the reception window is open receive an orthogonal frequency division multiplexing (OFDM), response signal transmitted from a second WD in response to the ranging signal; and
processing circuitry in communication with the transmitter and receiver, the processing circuitry configured to:
determine an expected bit sequence for a coded and scrambled OFDM response signal for each of a plurality of scrambler seeds;
open a reception window after each transmission; and
while the reception window is open:
receive an orthogonal frequency division multiplexing (OFDM), response signal transmitted from a second WD in response to the ranging signal;
detect the presence of an OFDM waveform in a sequence of received samples of the received OFDM response signal;
cross-correlate the received samples with local copies of a preamble waveform and searching for a known periodicity of the preamble waveform;
demodulate coded bits in the OFDM response signal;
correlate bits of the sequence of received samples of the received OFDM response signal with bits of expected sequences to determine a correlation value for each of the plurality of scrambler seeds to produce a plurality of correlation values, each correlation value being indicative of an extent to which a sequence of received samples matches an expected sequence; and
determine a maximum correlation value of the plurality of correlation values;
determine that the burst of N transmissions has ended;
sum the maximum correlation values for each sample in the reception windows;
calculate rolling sum of the sum of the N maximum correlation values;
determine the peak value of the rolling sum; and
determine a time t2 of the reception of the peak value of the rolling sum.

Embodiment 18. The airborne station of Embodiment 17, wherein the processing circuitry is further configured to use a branched preamble detector using multiple cross correlators in parallel branches, each cross correlator tuned to a different carrier frequency offset (CFO) to produce the plurality of correlation values, each CFO being within a range of offsets permitted by an IEEE 802.11 Standard;
determine the branch that produces a largest correlation; and
estimate the CFO based upon the branch that produces the largest correlation.

Embodiment 19. The airborne station of Embodiment 17, wherein the rolling sum value RS is defined as:
For $$i = \frac{(s-1)}{2} \text{ to } W - \frac{(s-1)}{2}$$

$$RS_i = \sum_{i-\frac{(s-1)}{2}}^{i+\frac{(s-1)}{2}} ac_i$$

where s=samples in the rolling sum window,
W=number of samples in the reception window, and, for $i=1$ to $W$, $ac_i = \Sigma_{n=1}^{N} C_{ni}$ where $N$ is the number of packets in a burst, $C_{ni} = \text{MAX}\{c_{ni}\}$ where $c_{ni}$ is the correlation value for ith sample in reception window n.

Embodiment 20. The airborne station of Embodiment 17, wherein the processing circuitry is further configured to compare the value of the peak rolling sum to a series of predetermined thresholds; and, if value exceeds the various thresholds:
output the time of reception t2, and attach corresponding confidence factors to its inclusion in the geo-location calculations.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the start and end times of the reception window, the time allowance for the maximum jitter of the turnaround time (SIFS) of a response signal, the duration field value(s), the MAC address used in the ranging packet, the details of the branched preamble correlator and number of branches, the threshold for the preamble detection, the details of the rolling sum window, the threshold for the peak rolling sum, and the confidence levels associated with the peak rolling sum levels. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device (WD) for determining a geo-location of a target station using round-trip times (RTTs) of a plurality of signals transmitted by the WD to the target station and a plurality of response signals received from the target station corresponding to the plurality of signals transmitted by the WD, the method comprising:
determining an expected response signal, the expected response signal having an expected response signal type and including a set of expected samples and a set of expected bits;
transmitting the plurality of signals;
for each transmitted signal of the plurality of signals:
receiving a response signal, the received response signal corresponding to the transmitted signal, the response signal having a response signal type and including a set of samples and a set of bits;
determining that the response signal type matches the expected response signal type based on at least a subset of the set of samples;
cross-correlating the set of samples of the response signal with the set of expected samples of the response signal and searching for a predetermined characteristic of the expected response signal;
correlating at least a subset of bits of the set of bits of the received response signal with the set of expected bits of the expected response signal, the correlation of at least the subset of bits generating a plurality of correlation outputs;
determining a peak rolling sum correlation based at least in part on the plurality of correlation outputs; and
determining the RTT for each transmitted signal of the transmitted plurality of signals based at least in part on the corresponding peak rolling sum correlation, the determined RTT being usable to determine the geo-location of the target station.

2. The method of claim 1, the method further including:
for each transmitted signal of the plurality of signals:
opening a reception window for receiving the response signal, the response signal being received within the reception window; and
performing the determination that the response signal type matches the expected response signal type while the reception window for receiving the response signal is open.

3. The method of claim 1, wherein cross-correlating the set of samples of the received response signal is performed in a set of branches, each branch of the set of branches tuning to a different time offset to cover a range of carrier frequency offsets, and the method further includes:
determining a set of rolling sums for each branch of the set of branches based at least on an amount of samples in a rolling sum window, a number of samples in the reception window, and a number of packets in a burst; and
determining the peak rolling sum correlation is further based in part on the determined set of rolling sums for each branch of the set of branches.

4. The method of claim 1, the method further including:
determining a maximum correlation value from the plurality of correlation outputs for each reception window; and
summing the maximum correlation value for each sample in each reception window.

5. The method of claim 1, the method further including:
determining a first time and a second time, the first time being a time of transmission of each transmitted signal, the second time being a time of reception of the peak rolling sum;
determining the RTT for each transmitted signal of the transmitted plurality of signals is further based at least on the first time and the second time; and
determining the geo-location of the target station based on the RTT for each transmitted signal.

6. The method of claim 1, wherein the transmitted plurality of signals are orthogonal frequency diversity modulation (OFDM) signals transmitted in a burst of N transmissions, the transmitted plurality of signals having a time between each transmission and a wait time between the burst and a subsequent burst, and the response signal type is an OFDM waveform.

7. The method of claim 1, wherein each transmitted signal is one of a request-to-send (RTS) signal and a data null signal, the set of expected samples of the expected response signal includes a preamble waveform, and the predetermined characteristic of the expected response signal is a predetermined periodicity of the preamble waveform.

8. The method of claim 1, wherein the set of bits of the response signal includes coded bits, and the method further includes:
determining a plurality of seeds associated with the response signal;
demodulating the coded bits of the response signal; and
performing the correlation of at least the subset of bits of the set of bits of the received response signal for each seed of the plurality of seeds based in part on the demodulated coded bits.

9. The method of claim 1, the method further including:
detecting an end of transmission of the plurality of signals;
attaching at least a corresponding confidence factor to the peak rolling sum correlation if the peak rolling sum correlation exceeds at least a predetermined threshold; and
determining the geo-location of the target station based at least on the attached at least corresponding confidence factor.

10. The method of claim 1, wherein the determined set of rolling sums is a rolling sum value RS that is defined as:
for
$$i = \frac{(s-1)}{2} \text{ to } W - \frac{(s-1)}{2}$$
$$RS_i = \sum_{i-\frac{(s-1)}{2}}^{i+\frac{(s-1)}{2}} ac_i$$

where s=samples in the rolling sum window,
W=number of samples in the reception window;

for $i=1$ to $W$, $ac_i = \Sigma_{n=1}^{N} C_{ni}$ where N is the number of packets in a burst; and $C_{ni} = MAX\{c_{ni}\}$ where $C_{ni}$ is the correlation value for ith sample in reception window n.

11. A wireless device (WD) for determining a geo-location of a target station using round-trip times (RTTs) of a plurality of signals transmitted by the WD to the target station, and response signals received from the target station corresponding to the transmitted signals, the WD comprising:
a transmitter configured to:
transmit the plurality of signals; and
a receiver configured to:
receive a response signal for each transmitted signal of the plurality of signals, the received response signal corresponding to the transmitted signal, the response signal having a response signal type and including a set of samples and a set of bits; and
processing circuitry in communication with the transmitter and the receiver, the processing circuitry being configured to:
determine an expected response signal, the expected response signal having an expected response signal type and including a set of expected samples and a set of expected bits;
for each transmitted signal of the plurality of signals:
determine that the response signal type matches the expected response signal type based on at least a subset of the set of samples;
cross-correlate the set of samples of the response signal with the set of expected samples of the response signal and search for a predetermined characteristic of the expected response signal;
correlate at least a subset of bits of the set of bits of the received response signal with the set of expected bits of the expected response signal, the correlation of at least the subset of bits generating a plurality of correlation outputs;
determine a peak rolling sum correlation based at least in part on the plurality of correlation outputs; and determine the RTT for each transmitted signal of the transmitted plurality of signals based at least in part on the corresponding peak rolling sum correlation, the determined RTT being usable to determine the geo-location of the target station.

12. The WD of claim 11, wherein the processing circuitry is further configured to:
for each transmitted signal of the plurality of signals:
cause the receiver to open a reception window for receiving the response signal, the response signal being received within the reception window; and
perform the determination that the response signal type matches the expected response signal type while the reception window for receiving the response signal is open.

13. The WD of claim 11, wherein the processing circuitry is further configured to:
determine a maximum correlation value from the plurality of correlation outputs for each reception window; and
sum the maximum correlation value for each sample in each reception window.

14. The WD of claim 11, wherein the processing circuitry is further configured to:
determine a first time and a second time, the first time being a time of transmission of each transmitted signal, the second time being a time of reception of the peak rolling sum;
determine the RTT for each transmitted signal of the transmitted plurality of signals is further based at least on the first time and the second time; and
determine the geo-location of the target station based on the RTT for each transmitted signal.

15. The WD of claim 11, wherein the transmitted plurality of signals are orthogonal frequency diversity modulation (OFDM) signals transmitted in a burst of N transmissions, the transmitted plurality of signals having a time between each transmission and a wait time between the burst and a subsequent burst, and the response signal type is an OFDM waveform.

16. The WD of claim 11, wherein each transmitted signal is one of a request-to-send (RTS) signal and a data null signal, the set of expected samples of the expected response signal includes a preamble waveform, and the predetermined characteristic of the expected response signal is a predetermined periodicity of the preamble waveform.

17. The WD of claim 11, wherein the set of bits of the response signal includes coded bits, and the processing circuitry is further configured to:
determine a plurality of seeds associated with the response signal;
demodulate the coded bits of the response signal; and
perform the correlation of at least the subset of bits of the set of bits of the received response signal for each seed of the plurality of seeds based in part on the demodulated coded bits.

18. The WD of claim 11, wherein cross-correlating the set of samples of the received response signal is performed in a set of branches, each branch of the set of branches tuning to a different time offset to cover a range of carrier frequency offsets, and the processing circuitry is further configured to:
determine a set of rolling sums for each branch of the set of branches based at least on an amount of samples in a rolling sum window, a number of samples in the reception window, and a number of packets in a burst; and determine the peak rolling sum correlation further based in part on the determined set of rolling sums for each branch of the set of branches.

19. The WD of claim 11, wherein the processing circuitry is further configured to:
detect an end of transmission of the plurality of signals; and
attach at least a corresponding confidence factor to the peak rolling sum correlation if the peak rolling sum correlation exceeds at least a predetermined threshold; and
determine the geo-location of the target station based at least on the attached at least corresponding confidence factor.

20. A measuring station, the measuring station comprising a wireless device (WD) for determining a geo-location of a target station using round-trip times (RTTs) of a plurality of signals transmitted by the WD to the target station, and response signals received from the target station corresponding to the transmitted signals, the WD comprising:
a transmitter configured to:
transmit the plurality of signals; and
a receiver configured to:
for each transmitted signal of the plurality of signals:
open a reception window for receiving a response signal corresponding to one transmitted signal; and
receive the response signal within the reception window, the received response signal having a response signal type and including a set of samples and a set of bits including coded bits; and
processing circuitry in communication with the transmitter and the receiver, the processing circuitry being configured to:
determine an expected response signal, the expected response signal having an expected response signal type and including a set of expected samples and a set of expected bits;
for each transmitted signal of the plurality of signals:
determine a first time, the first time being a time of transmission of each transmitted signal;
while the reception window is open, determine that the response signal type matches the expected response signal type based on a subset of the set of samples;
cross-correlate the set of samples of the response signal with the set of expected samples of the response signal and search for a predetermined characteristic of the expected response signal;
correlate at least a subset of bits of the set of bits of the received response signal with the set of expected bits of the expected response signal, the correlation of at least the subset of bits generating a plurality of correlation outputs;
determine a maximum correlation value from the plurality of correlation outputs for each reception window;
sum the maximum correlation values for each sample in each reception window;
determine a peak rolling sum correlation and a second time, the second time being a time of reception of the peak rolling sum; and
determine the RTT for each transmitted signal of the transmitted plurality of signals based at least on the first time and the second time in part to determine the geo-location of the target station.

* * * * *